US008166386B2

(12) United States Patent
Chang et al.

(10) Patent No.: US 8,166,386 B2
(45) Date of Patent: Apr. 24, 2012

(54) METHOD AND SYSTEM FOR PRODUCING PATENT SPECIFICATION

(76) Inventors: Chung-Yuh Chang, Keelung (TW); Yao-Hui Chang, Taipei (TW)

( * ) Notice: Subject to any disclaimer, the term of this patent is extended or adjusted under 35 U.S.C. 154(b) by 943 days.

(21) Appl. No.: 12/044,973

(22) Filed: Mar. 9, 2008

(65) Prior Publication Data

US 2008/0313528 A1    Dec. 18, 2008

(30) Foreign Application Priority Data

Jun. 15, 2007 (TW) .............................. 96121667 A

(51) Int. Cl.
*G06F 15/00* (2006.01)
(52) U.S. Cl. ........ 715/225; 715/221; 715/243; 715/255; 715/273
(58) Field of Classification Search .................. 715/200, 715/221, 222, 224, 225, 243, 273, 255
See application file for complete search history.

(56) References Cited

U.S. PATENT DOCUMENTS

| 6,671,855 | B1 * | 12/2003 | Hayashi et al. ............... 715/234 |
| 7,672,950 | B2 * | 3/2010 | Eckardt et al. ........... 707/999.01 |
| 2002/0188561 | A1 * | 12/2002 | Schultz ........................... 705/40 |
| 2004/0128623 | A1 * | 7/2004 | Hudson ......................... 715/530 |
| 2004/0183837 | A1 * | 9/2004 | Watanabe et al. ............. 345/853 |
| 2004/0236678 | A1 * | 11/2004 | Johns et al. ...................... 705/38 |
| 2005/0094206 | A1 * | 5/2005 | Tonisson ...................... 358/1.18 |
| 2006/0106847 | A1 * | 5/2006 | Eckardt et al. ................ 707/101 |
| 2006/0294180 | A1 * | 12/2006 | Lovisa .......................... 709/203 |

\* cited by examiner

*Primary Examiner* — Stephen Hong
*Assistant Examiner* — Gregory J Vaughn
(74) *Attorney, Agent, or Firm* — Rosenberg, Klein & Lee

(57) ABSTRACT

A method and system for producing a patent specification is capable of producing a patent specification draft rapidly for the inventor, applicant or patent attorney, thereby reducing the time to complete the specification and improving the mutual understanding between the inventor and the patent attorney. After the inventor inputs the technical characteristics and other related description via a graphic interface, a patent specification draft can be produced rapidly. The method includes the steps of inputting a title, selecting the type of invention, entering the graphic interface, inputting the name and function of each element to form an output data section, inputting the data having multiple sets of text areas, cooperating the input data having multiple sets of text areas with individual output data section, combining, trans-pasting and composing the corresponding input description to form multiple sets of output data sections. In this way, the contents of a patent specification can be formed.

17 Claims, 15 Drawing Sheets

| Disclosure of Invention Technology | PAGE1 |
|---|---|
| Title of Invention | |
|---|---|
Selecting the appropriate type of the disclosure invention After selection, inputting each element or each procedure name and the function or explanation thereof
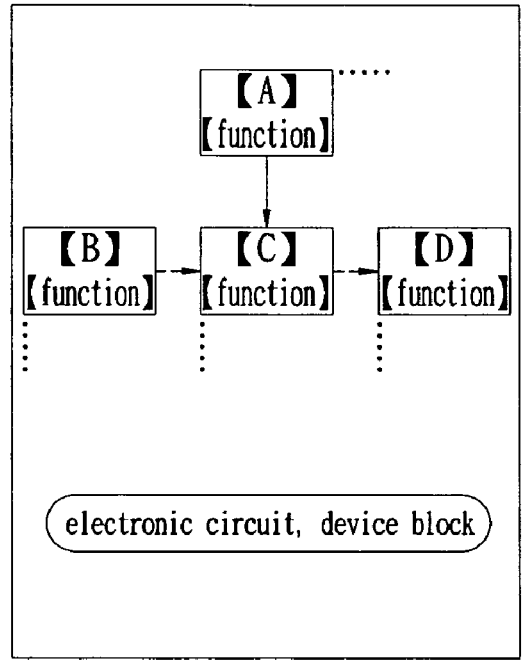
electronic circuit, device block
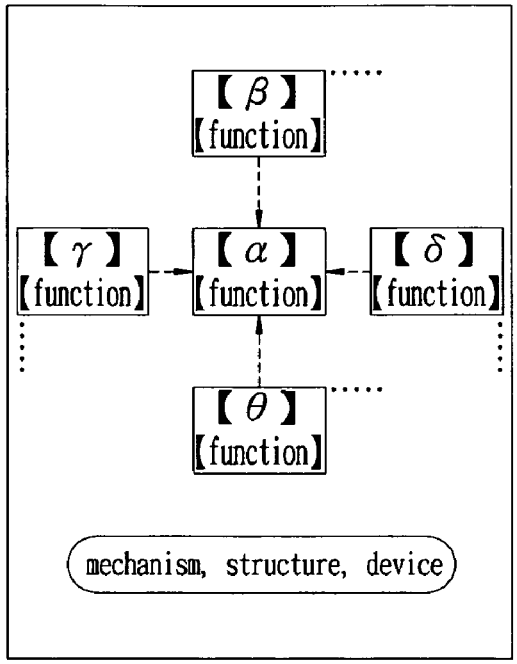
mechanism, structure, device
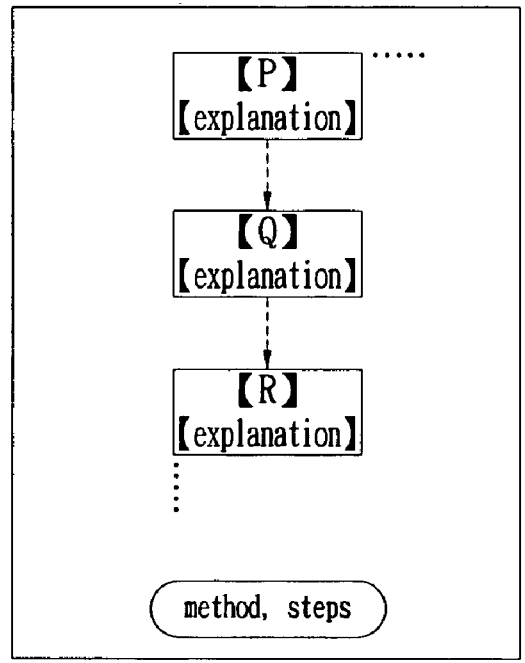
method, steps
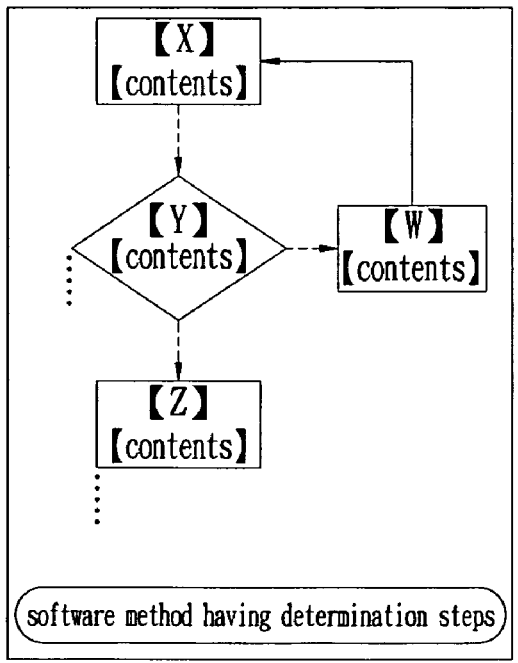
software method having determination steps
FIG. 8

| What is the motive and object of the disclosure invention? (For example, the contents, drawbacks of prior art and the objects, improved effects of the present invention can be described briefly.) | PAGE2 |
|---|---|

10 → (label for the question box above)

【Motive of Invention】

12 → [ text box ]

【Object of Invention】

14 → [ text box ]

【Field of Invention】

15 → [ text box ]

【Description of Prior Art】

16 → [ text box ]

【Drawbacks of Prior Art】

18 → [ text box ]

FIG. 9

| Related Description of the Disclosure Invention | PAGE3 |
【Method for solving the problems】
20 — 
【Comparison between the disclosure invention and prior art】
30 — 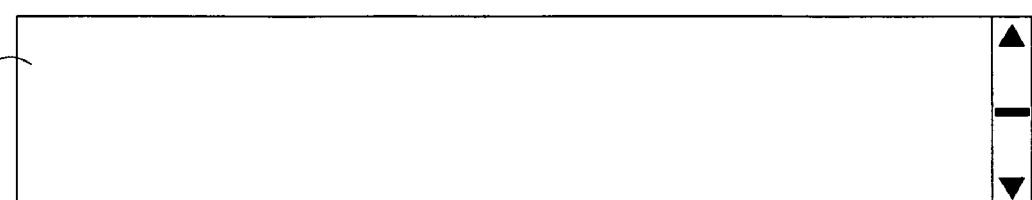
【Embodiment (the embodied method, steps, circuit, device, structure or chemical component of the disclosure invention)】
40 — 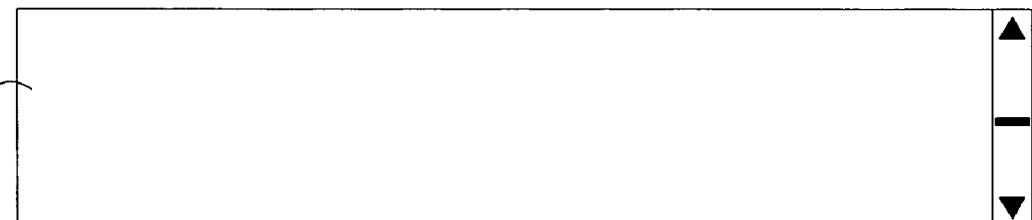
【Technical expansion of the disclosure invention】
50 — 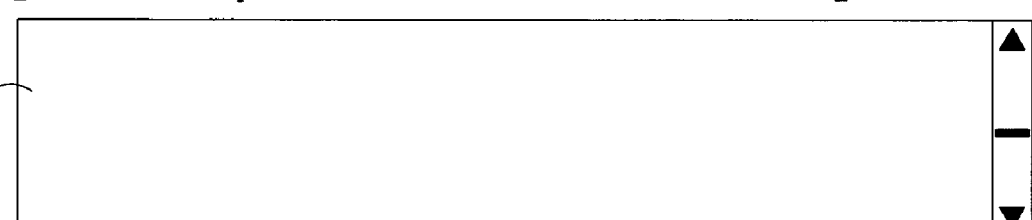
【Reference document】
60 — 
FIG. 10

| Drawings or Other Supplementary Information of the Disclosure Invention | PAGE4 |
|---|---|

[Drawing Section] — 70

72

[Description of Supplementary Information]

76

FIG. 11

Patent Specification

【Title of Invention】

1000 ~ [                                    ]

【Abstract】

1200 ~ [                                    ]

【Field of Invention】

1300 ~ [                                    ]

【Prior Art】

1400 ~ [                                    ]

【Summary of Invention】

1500 ~ [                                    ]

【Detailed Description of Invention】

1600 ~ [                                    ]

【Brief Description of Drawings】

1700 ~ [                                    ]

【Claims】

1900 ~ [                                    ]

FIG. 12

METHOD AND SYSTEM FOR PRODUCING PATENT SPECIFICATION

BACKGROUND OF THE INVENTION

1. Field of the Invention

Figure 1:
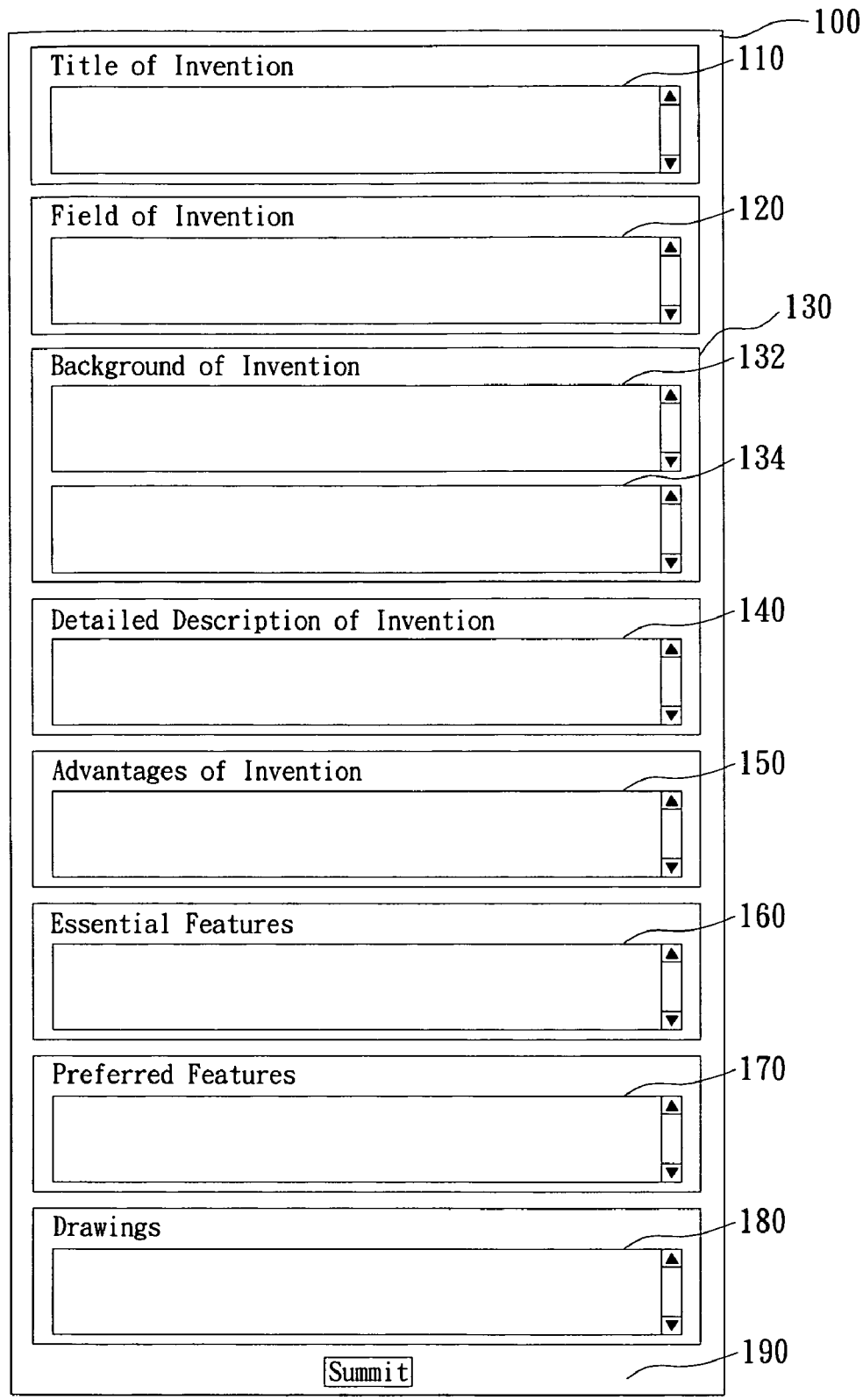
Fig. 1 is a⋯.

The present invention relates to a method and system for producing a patent specification, and in particular to a method and system for producing a patent specification, thereby facilitating the inventor or the patent attorney to complete a patent specification rapidly and efficiently.

2. Description of Background Art

Nowadays, when a new technology or invention is created and needs to be protected, it occur to people immediately that such a new technology or invention can be protected by the intellectual property right because this is still a primary means for protecting the patent right.

When the inventor intends to file a patent application based on his/her novel technology or invention, it is necessary for the inventor to transform the technical contents thereof into the form of patent specification for filing. Essentially, the patent right is based on the technical contents of the invention, which is protected by means of the Patent Law. The patent specification itself is a legal document for representing the novel technology in a form of written words (and drawings). Therefore, there are many requirements and regulations relating to the expression of the description of the patent specification. Even one who is skilled in the stipulations of the Patent Law may still find that it is not easy to compose a patent specification, and thus, as for the inventor, unless well-experienced in filing patents, he/she will feel strange to compose the patent specification and even have wrong ideas about patent regulation.

In general, when the inventor intends to file a patent application, he/she will meet and discuss with the patent attorney or patent agent of a patent and law office about the technical contents of the invention, so that the patent attorney or patent agent can understand the technical contents, compose a patent specification according to the formal form, and submit a patent application to the Patent Office.

According to the above, the effort of the patent attorney or patent agent is still the most common way of composing a patent specification. However, the time to complete the patent specification and the quality thereof depend on the quality and practical experience of the patent attorney, patent agent, staffs of the patent and law office, or the patent engineer. Sometimes, the applicant is eager to submit the patent application because this new technology is going to be public or sell soon all over the world. Thus, the inventor requires that the patent and law office should complete the patent specification for filing as soon as possible. As a result, the patent attorney or patent agent would be always under the pressure of composing the patent specification in a short period.

Since the computer technology is so well developed now, the computer technology should facilitate the patent attorney to edit rapidly a basic patent specification, a patent specification draft or even a finished specification ready for filing based on the technical contents (not limited to characters, images or voices type) disclosed in the discussion with the inventor, thereby completing the above-mentioned laborious task of composing the patent specification and reducing the burden of the patent attorney or patent agent. By building up a way of determining, arranging and combining the description of technical disclosure content, a patent draft reference document is required and can be produced to help the patent attorney or patent agent to compose the patent specification. The content of the reference document is need to close to the essential requirements for the Patent Law, Code of Federal Regulation, Implementing Regulations of the Patent Law and Manual of Patent Examining Procedure, or close to the expressions of patent practice.

There are many books available in the market to teach the basic concepts of patent and the composition of the patent specification. For example, a textbook entitled "Patent It Yourself", written by David Pressman, describes basic concepts of patent and briefly instructs the composition of the patent specification in view of filing in America. However, as for the composition of the patent specification, that book only provides conceptive instructions for the purpose of education, but not provides a system or method for producing a patent draft rapidly. Further, another well-known textbook entitled "Landis on Mechanics of Patent Claim Drafting", written by Robert C. Faber, also only teaches the writing of the patent specification, also not be satisfied for a patent specification rapidly generation system.

Among the conventional patent applications, it is found that US Patent Application No. 20040128623 A1, entitled "System and method for producing a patent specification and patent application", provides a system and method for producing a patent specification. As shown in FIG. 1, the above-mentioned background art provides the patent agent or patent attorney with a patent draft for reference, in which a form 100 is provided to have a plurality of text fields such as the field 110 headed "Title of Invention", the field 120 headed "Field of Invention", the field 130 headed "Background of Invention", the field 140 headed "Detailed Description of Invention", the field 150 headed "Advantages of Invention", the field 160 headed "Essential Features", the field 170 headed "Preferred Features", and the field 180 headed "Drawings". When a user inputs all of the text fields, a patent specification draft can be produced correspondingly.

However, the form 100 shown in FIG. 1 corresponds to the standard form of a patent specification for filing in America and is suitable for the patent attorney or patent agent only. The inventor, members of the research and development department or general staffs are not familiar with the form 100. In general, when the inventor develops a novel technology, method or product, preferably, the inventor should write a disclosure of technical content, a technical report, a thesis in journals, or even a working diary to disclose and explain the developed technical contents. Further, when the inventor has proposed his/her new technical development result and intends to file a patent application for protecting the patent right, most applicants appeal to the patent and law firm to compose a patent specification. Since the form shown in FIG. 1 is not a form suitable for the inventor or R & D member to disclose the new developed technical contents, it is still necessary for the patent attorney, patent agent or patent engineer to spent their time and effort to study and digest the developed result disclosure of the invention, and then to fill the individual text fields of the form shown in FIG. 1 to produce a patent specification correspondingly. Obviously, the method for producing a patent specification disclosed in FIG. 1 only belongs to a trans-pasting of text blocks, which only transpastes the input data to another text block without judging, arranging, combining and linking the technical disclosure data input by the inventor or R & D member to produce a patent specification. FIG. 1 should be changed and improved to close to the inventor for input and then output the patent drafting which matched with Patent Law.

SUMMARY OF THE INVENTION

In view of the above-mentioned drawbacks of background art, the inventor provides a method and system for producing a patent specification, which conforms to the standpoint of a R&D staff, the inventor or the applicant to serving as a means of disclosing the technology and an input interface for the system. With the corresponding graphic or icon interface in cooperation with the practical experience and regulations for the composition of patent specifications, the user can complete a patent specification draft more easily, which is not merely a trans-pasting of the input data according to the original form of patent specification.

The illustrated embodiment of this invention is to provide a system and method for producing a patent specification, by which the inventor, the applicant, patent attorney or the patent agent can produce a patent specification drafting rapidly for reference or even for official filing. The input interface thereof conforms to the form of technical disclosure for the inventor, R & D staff or the patent applicant. With respect to different fields of technologies, individual corresponding graphic or icon interface is provided, so that the user can input the description relating to the technical characteristics more easily, reducing the workload necessary for studying and digesting the technical disclosure contents and the time to compose the patent specification. Also, the communication between the inventor, applicant and the patent agent, patent attorney becomes more efficient. When the inventor completes the disclosure of related technology and inputs to the computer, via the method of the present invention, a patent specification draft conforming to the form of patent application can be produced rapidly, even ready for filing directly. In this way, a general person can use the method of the present invention and the input interface to obtain a patent specification draft rapidly after judging, transforming, arranging and combining the input data by this invention.

The illustrated embodiment is to provide a method for producing a patent specification including the steps of: inputting a title; entering selection items for selecting the field of invention from a group consisting of electronic circuit, structural device, software method and biological chemistry; entering a graphic interface according to the selected type of invention; inputting names with functions corresponding to the graphic interface to form an output data section; inputting data having multiple sets of text areas; cooperating the input data having multiple sets of text areas with individual output data section; combining, trans-pasting and composing the corresponding input description to form multiple sets of output data sections; and outputting the document having multiple sets of output data to form the contents of a patent specification.

Another illustrated embodiment also provides a system for producing a patent specification in which a method for producing a patent specification is built, such as a software or application program. The system of the present invention can produce a written document of the patent specification. The system includes a central processing unit for performing the method of producing a patent specification; a data storage unit connected with the central processing unit, the data storage unit saving the method of producing the patent specification and providing the method for the central processing unit to perform the production of the patent specification; an input unit connected with the central processing unit to provide an interface for the user to input the disclosure of associated technology; a control unit connected with the central processing unit for controlling the system to perform the processing of the data relating to the production of the patent specification; an output unit connected with the central processing unit for acting as output interface for the data relating to the patent specification, the output unit connected with a printing unit to print the patent specification; and a displaying unit connected with the central processing unit for acting as a displaying interface to display the data of the patent specification.

BRIEF DESCRIPTION OF THE DRAWINGS

Figure 2:
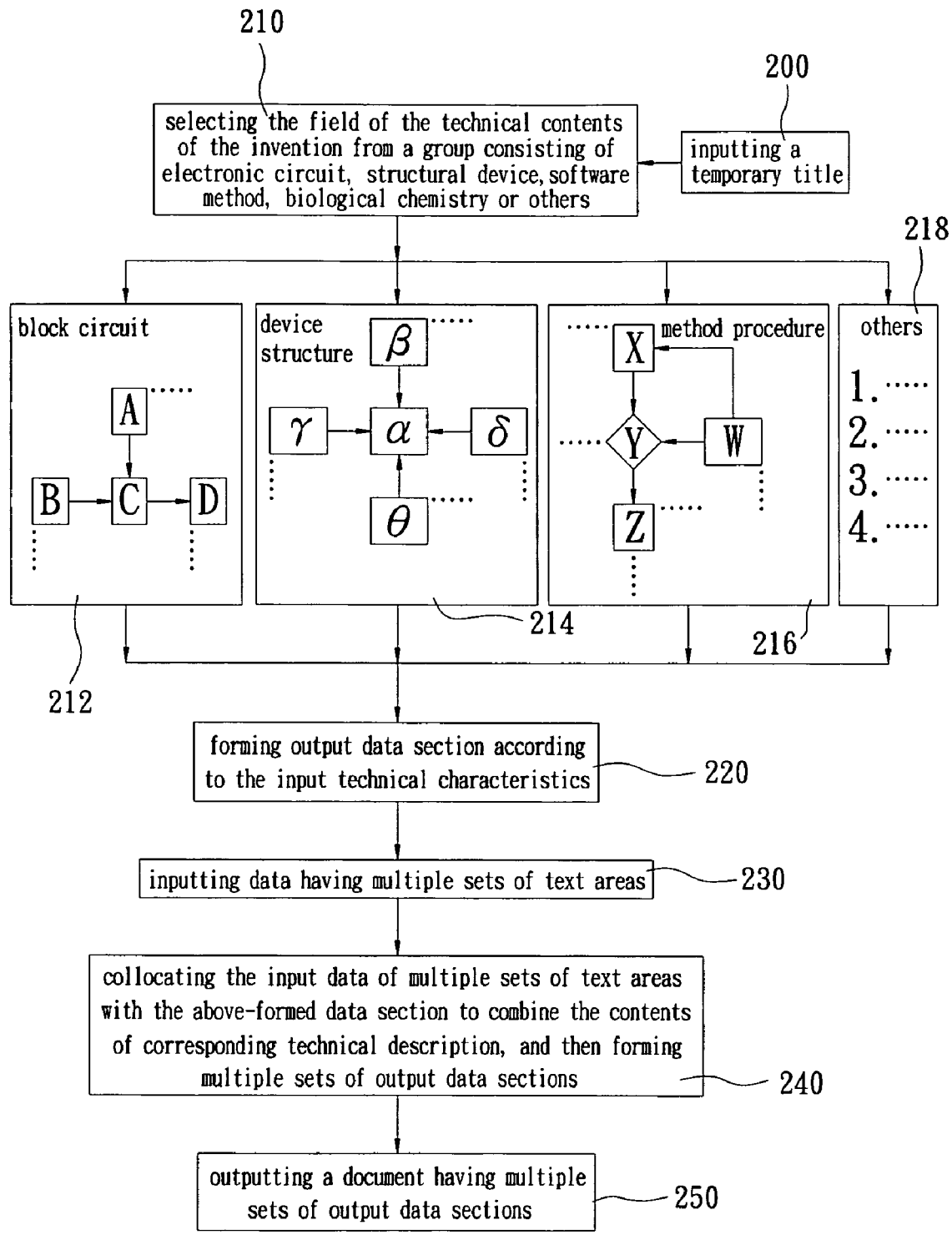
Fig. 2 is a⋯.
Figure 3A:
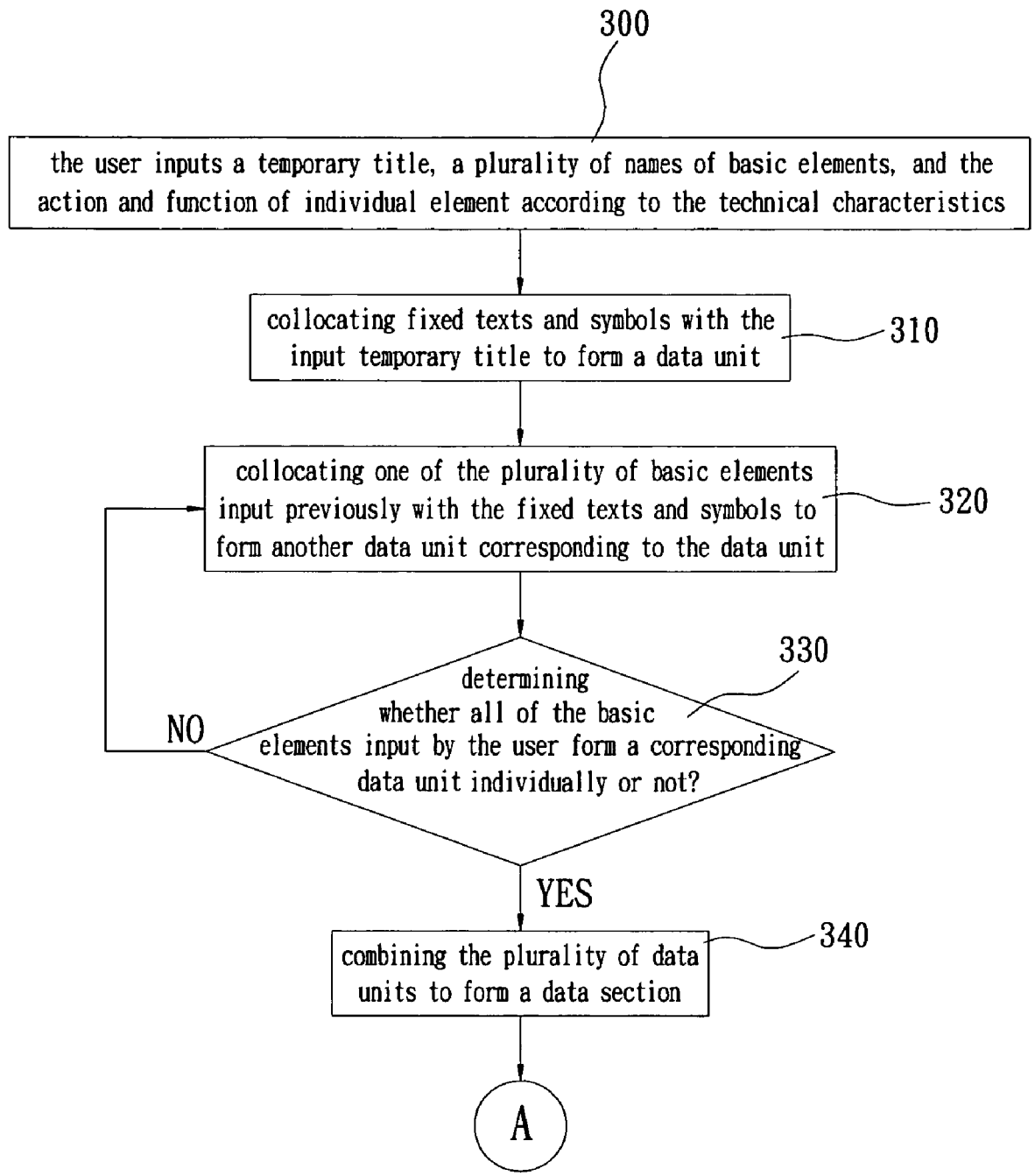
Fig. 3 is a⋯.
Figure 3B:
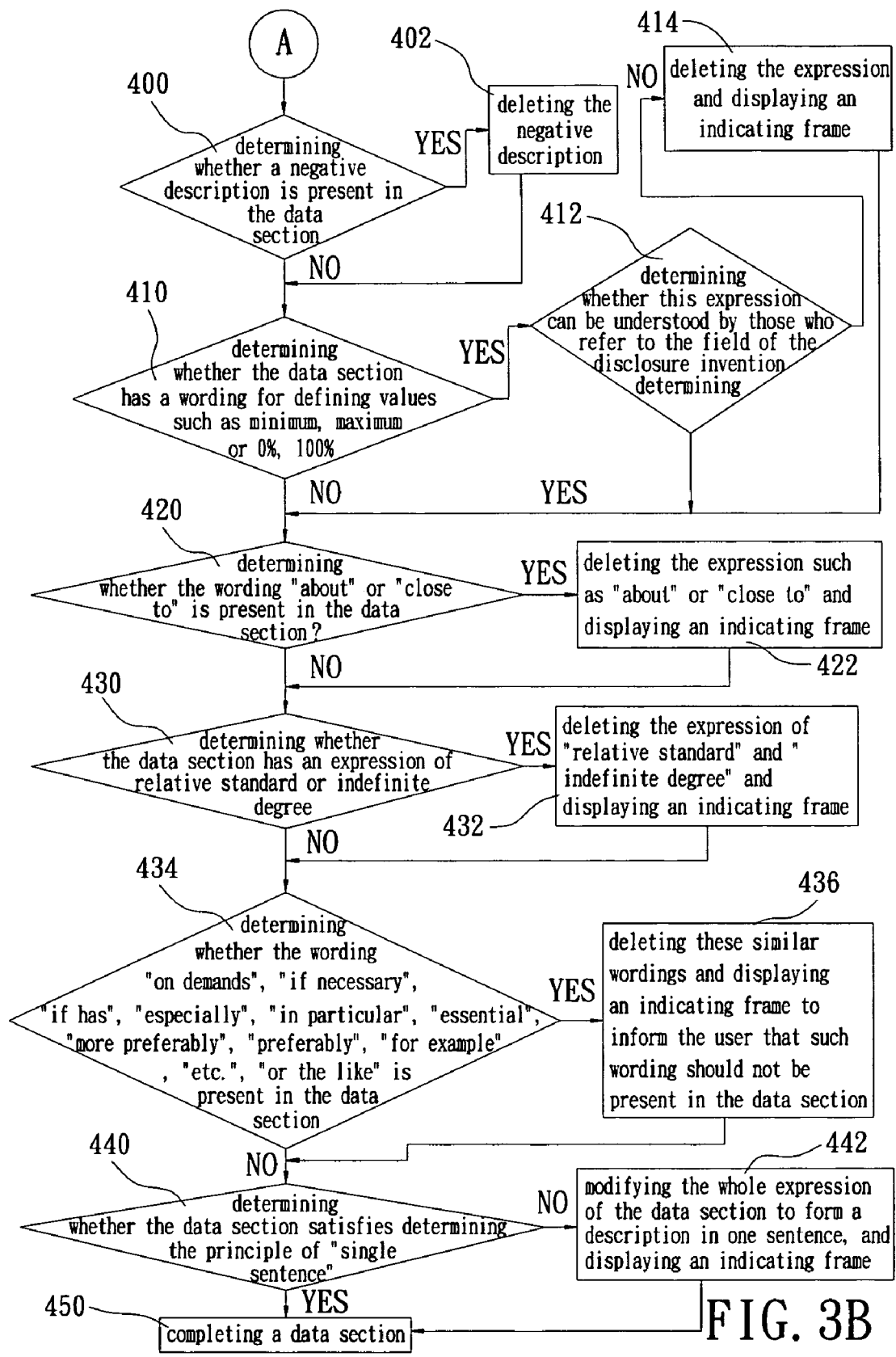
Figure 4A:
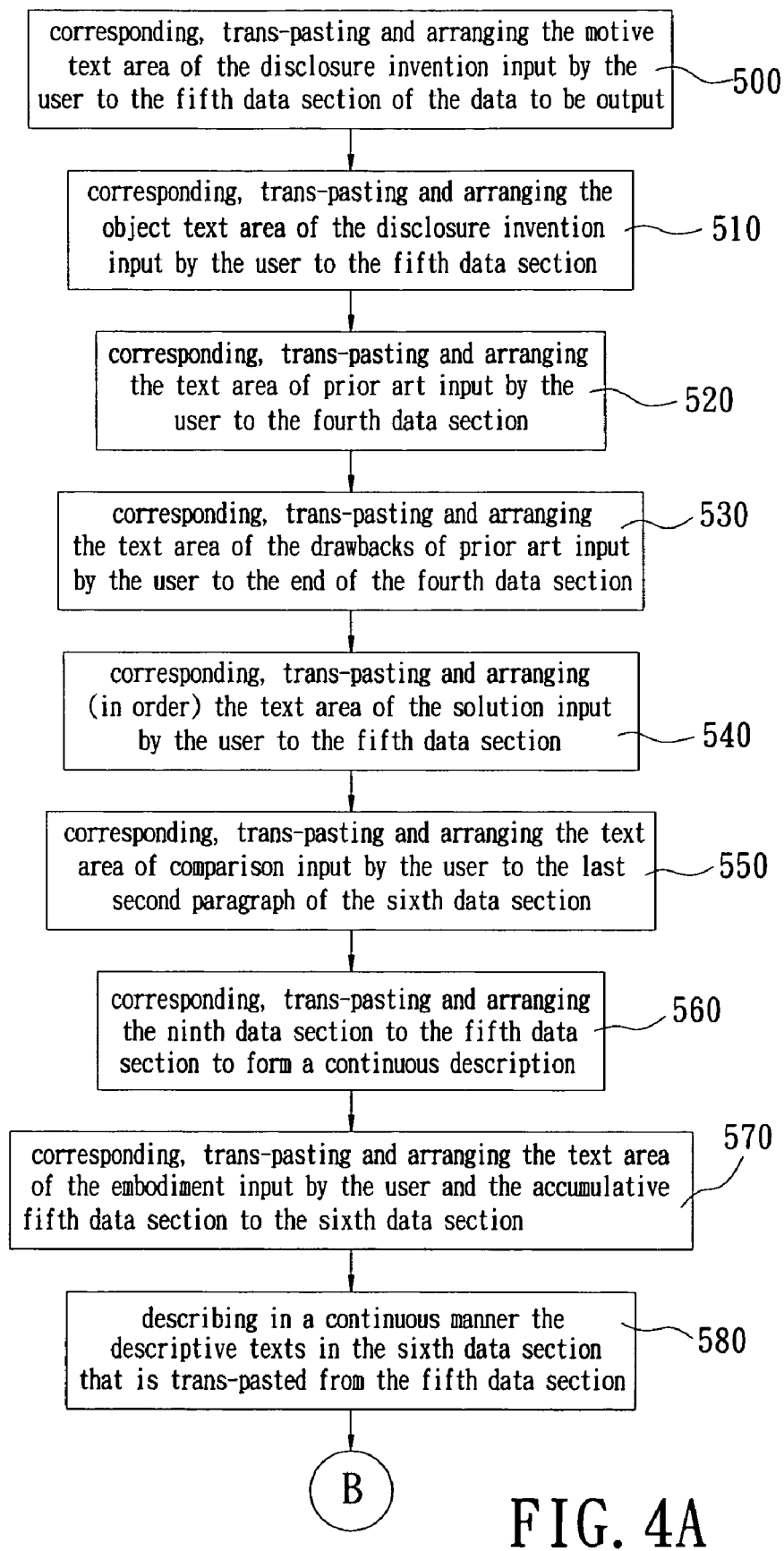
Figure 4B:
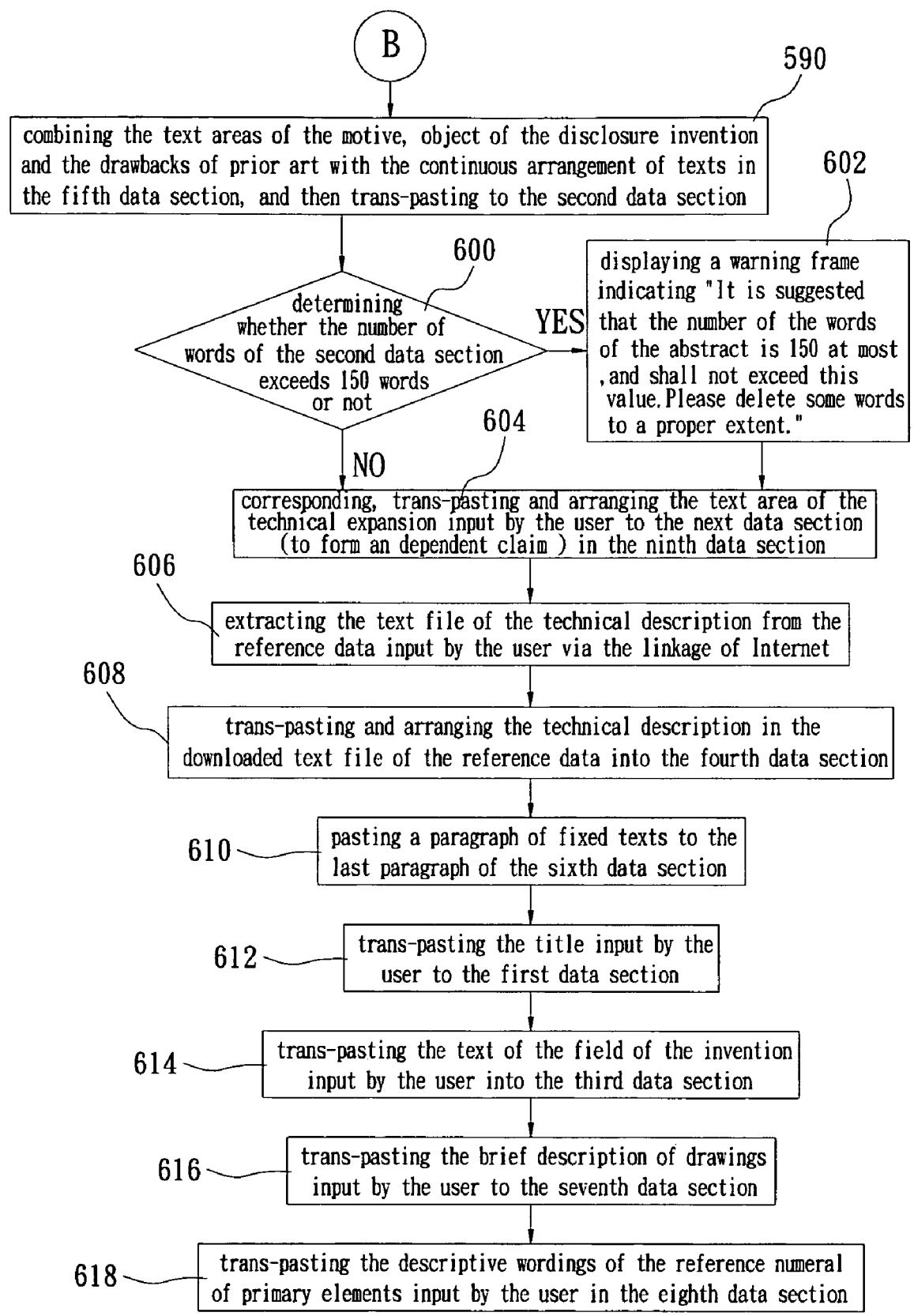
Figure 5:
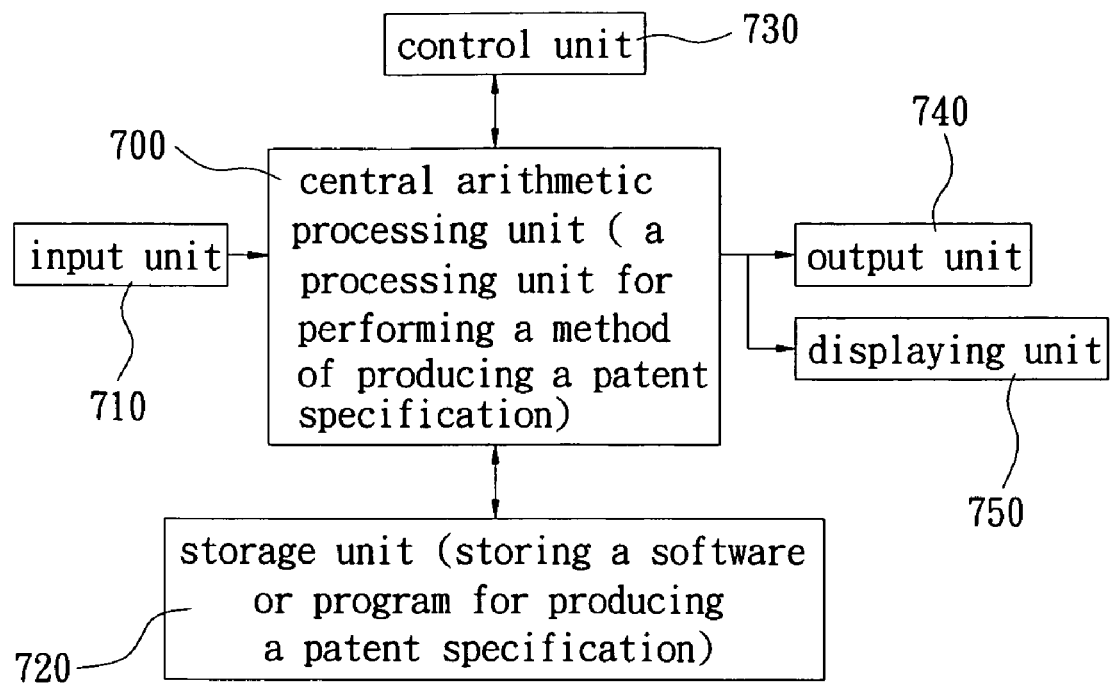
Figure 7:
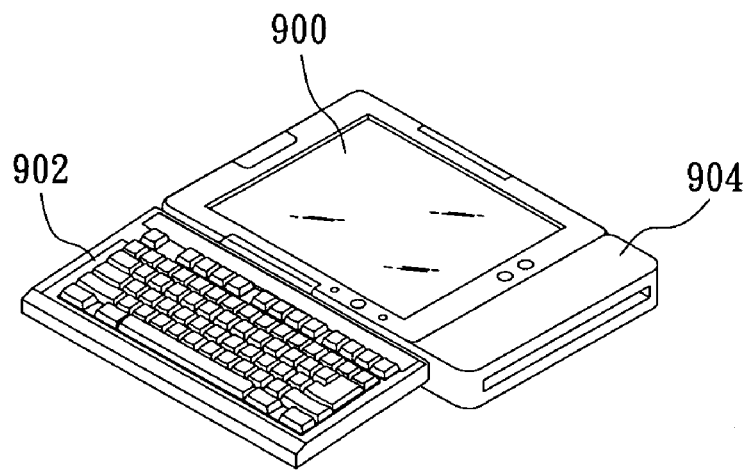
Figure 6:
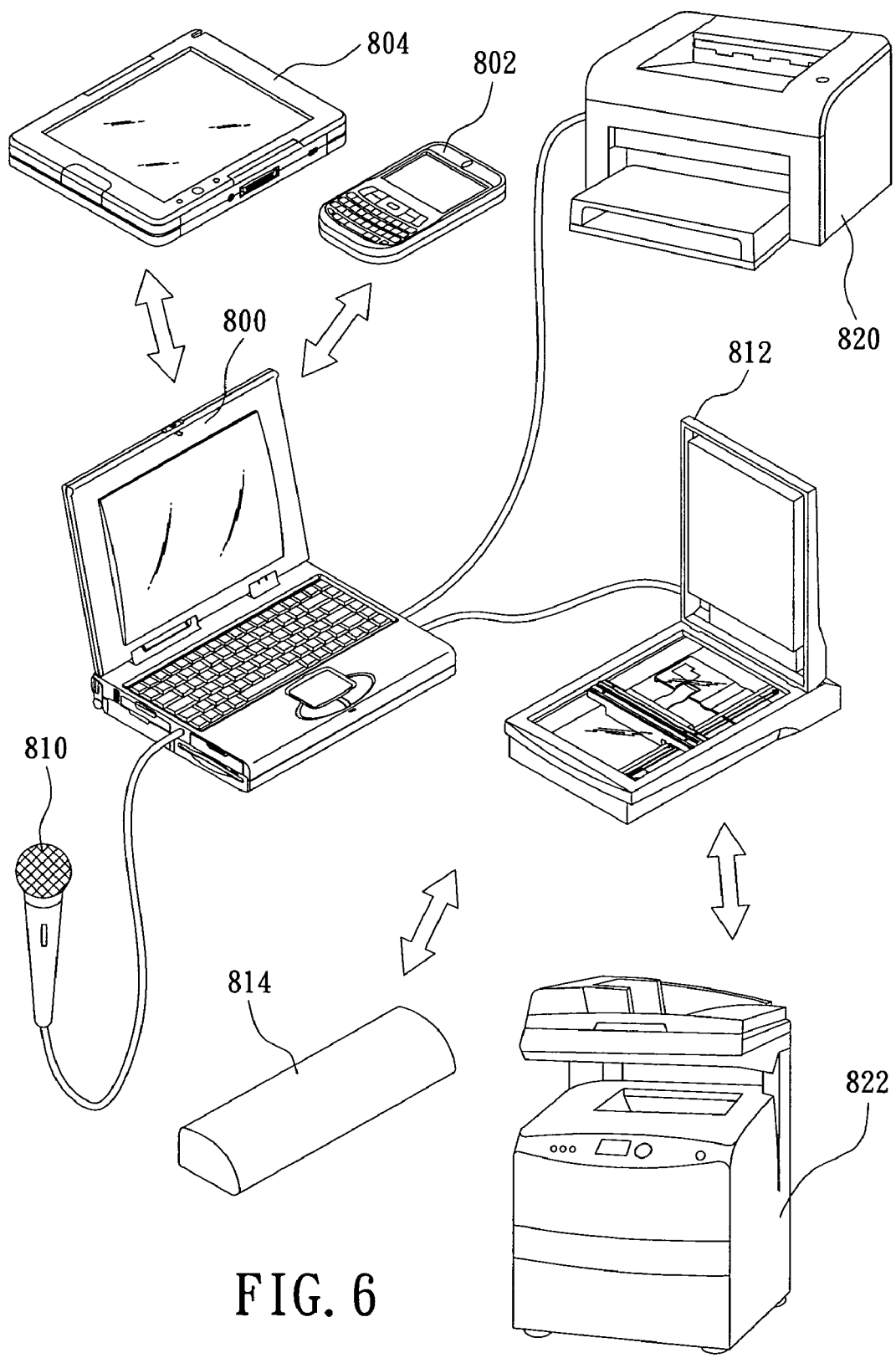

FIG. 1 is a representative view of background art;

FIG. 2 is a flow chart showing the method of the embodiment of the present invention;

FIG. 3A is a flow chart showing the method of the embodiment of the present invention, in which a data section is formed as a description of claims;

FIG. 3B is a flow chart showing the method of the embodiment of the present invention, in which the texts and content are further determined with respect to the data section in FIG. 3A;

FIG. 4A is a flow chart showing the method of the embodiment of the present invention, in which data sections relating to background art, the summary of invention and detailed description are formed;

FIG. 4B is a flow chart showing the method of the embodiment of the present invention, in which other data sections of the patent specification are formed after the completion of the data section in FIG. 4A;

FIG. 5 is a schematic view showing the blocks of the system in accordance with the illustrated embodiment of the invention;

FIG. 6 is a schematic view showing the associated peripheral devices of a computer that is an embodiment corresponding to the system of the illustrated embodiment of the invention;

FIG. 7 shows a computer system having a portable printer in the system of the embodiment of the present invention;

FIG. 8 shows the first page of the "Disclosure of Invention Technology" in a user interface provided by the embodiment of the present invention;

FIG. 9 shows the second page of the "Disclosure of Invention Technology" in a user interface provided by the embodiment of the present invention;

FIG. 10 shows the third page of the "Disclosure of Invention Technology" in a user interface provided by the embodiment of the present invention;

FIG. 11 shows the fourth page of the "Disclosure of Invention Technology" in a user interface provided by the embodiment of the present invention;

FIG. 12 is a schematic view showing a patent specification in a standard form for filing.

DETAILED DESCRIPTION OF THE INVENTION

In order to reduce the time and effect consumed during the composition of a patent specification and the communication between the inventor and patent staffs, the present invention provides a method and system for producing a patent specification based on the standpoint of the inventor so as to facilitate the disclosure of a novel technology, thereby improving the efficiency and performance of composing the patent specification with regard to common people or patent-related staffs.

The illustrated embodiment of invention provides a method and system for producing a patent specification. In practical use, the method can be embodied as computer software, which is capable of judging, comparing and editing the texts or text database automatically. In order to better understand the technical contents of the embodiment, a detailed description will be made with reference to the accompanying drawings. First, with reference to FIG. 2, it is a flow chart showing the method of an embodiment of the present invention, which is one of the novel primary constructions of the present invention. Via these steps of FIG. 2, a patent specification draft can be produced, so that the patent-related staffs can understand the core of the patent specification rapidly, thereby reducing the time for preparation or only spending a little time to polish the draft to finish a completely correct patent specification. On the other hand, the present invention can provides a model of a patent specification rapidly for the inventor who does not have any experience in filing a patent application. In this way, the inventor can have a preliminary understanding of the patent specification, and thus is guided to compose the characteristic elements of the patent specification. Therefore, the method and performance of this invention is not only different from the background art, but also batter than the background art.

Further, for easy reading, the described content of the present invention is indicated by a "text area" to represent a text area input by the user with respect to the related description of the technology, which belongs to an input end. On the other hand, a "data section" is used to represent a data section relating to an output patent specification after performing the method of the present invention, which belongs to an output end. In this way, it is convenient to understand the meaning of the texts used in the description of the present invention, thereby further understanding the technical contents of the present invention which is indeed novelty and non-obvious.

With reference to FIG. 2, first, the user inputs a temporary title (step 200). The so-called temporary title means that such a temporary title is input as the title of invention temporarily so that the inventor needs not to spend too much time considering a proper title and thus the whole document can proceed to the subsequent steps. After the whole document is completed, the temporary title can be modified. Of course, if the user is well experienced in patent practice, he/she can input a complete and accurate title of invention directly without inputting a temporary title. Then, the user enters the selection items (step 210) for selecting the field of invention, which should be described in more detail because this selection item will perform a selected action first according to the selected type of graphic interface. The illustrated embodiment of the present invention allows the user to select the field of the technical contents of the invention from a group consisting of electronic circuit, structural device, software method, biological chemistry or others. The above types of the field of invention are used to illustrate only on the basis of current patent processing practice, but not to restrict the application of the present invention. For example, the field of invention can be further extended to a manufacturing procedure of semiconductors, articles for daily use, Internet, etc.

When the user selects an appropriate filed for his/her invention, the method proceeds to the next step 212, 214, 216 or 218, in which a graphic interface is display according to the selected type, so that the user is required to input more associated data. Further, the graphic interface shown in FIG. 2 could be completed more detail by icon double clicking into every individual block. So the graphic interface of this invention is also could be icon interface. As shown in FIG. 2, the selection of different fields of invention corresponds to different graphic interfaces. If the user selects the type of electronic circuit, the corresponding graphic interface formed of circuit blocks A, B, C, D is displayed (step 212). The four blocks are only illustrative, and the user can increase the number of the blocks according to practical demands. In use, the blocks A, B, C, D can be primary elements for constituting an electronic circuit type of patent application case, and the items connected by arrows can be further changed according to the practical demands. If the direction of the arrow or the connected item is changed, the corresponding contents for describing the electronic circuit will be changed accordingly.

If the user selects the type of the structural device, the corresponding graphic interface formed of structural blocks $\alpha, \beta, \gamma, \delta, \theta$ is displayed (step 214). The blocks $\alpha, \beta, \gamma, \delta, \theta$ can be primary elements for constituting a structural device type of patent application case, and similarly, the items connected by arrows can be further changed according to the practical demands. If the direction of the arrow or the connected item is changed, the corresponding contents for describing the structural device will be changed accordingly.

If the user selects the type of the software method, the corresponding graphic interface formed of steps blocks X, Y, Z, W is displayed (step 216). The blocks X, Y, Z, W can be primary steps for constituting a method type of patent application case, and similarly, the items connected by arrows can be further changed according to the practical demands. If the direction of the arrow or the connected item is changed, the corresponding contents for describing the procedure will be changed accordingly. Further, in the method procedure shown in FIG. 2, the corresponding user input interface (FIG. 8) thereof can be further divided into steps of a method or a software method having determination steps.

Finally, if the user selects the type of the biological chemistry or other type, the corresponding graphic interface "others" formed of a list of items is displayed (step 218) to describe item by item or process by process. Further, in the present embodiment of the present invention, the selections items of the method of the biological chemistry are showed in the frame interface "others" (step 218) in FIG. 2 (step 210). Similarly, the contents of the items can be changed according to the practical demands. If the contents of the item are changed, the corresponding contents for describing the biological chemistry or other types will be changed accordingly.

In order to supplement the contents of steps 212, 214, 216 and 218 in FIG. 2, with reference to FIG. 8, a reference sample of a "Disclosure of Invention Technology" is provided. The layouts of the "Disclosure of Invention Technology" are suitable for the inventor as a user, and each field thereof approaches the contents of the document for a special case when the inventor proposes a novel technology (such as working diary, research report, special project, disclosure of technology development or the like). The "Disclosure of Invention Technology" allows the user (i.e., inventor or R&D staffs) to disclose the conceptual contents of his/her invention in a written form. In addition to a description of the developed technology contents of the inventor, the "Disclosure of Invention Technology" can be the contents disclosed in a working diary inside a company. Currently, the department of research and development of a hi-technical company usually has this kind of document. Also, a patent and law firm may provide a similar form sheet for the client, but in different layout form. In the present embodiment of the present invention, the illustrated "Disclosure of Invention Technology" comprises four pages. These four pages (PAGE 1-4) show a plurality of fields, and it is unnecessary to finish the disclosure in only one page. If the content of the description exceeds more than one page, the "Disclosure of Invention Technology" will extend the number of pages of the texts automatically for describing all the contents, while all of the fields shown in the four pages of the "Disclosure of Invention Technology" will still exist.

The contents of the four pages of the "Disclosure of Invention Technology" will be described schematically as follows. The first page of the disclosure of patent concepts (PAGE 1, as shown in FIG. 8) allows the user to input the title of invention. As mentioned in the above, this title can be a temporary title and can be modified later during the composition of the patent specification. Then, the user selects the appropriate type of the invention which he wants to patent from the four blocks. After selection, the user inputs each element name and the function or explanation thereof. Further, the second page of the "Disclosure of Invention Technology" (as shown in FIG. 9) relates to the object of the disclosure invention (e.g. the contents and drawbacks of prior art, and the objects and improvements of the present invention can be described briefly). The third page of the "Disclosure of Invention Technology" (as shown in FIG. 10) relates to the related description of the disclosure invention. The fourth page of the "Disclosure of Invention Technology" (as shown in FIG. 11) relates to the drawings or other supplementary information of the disclosure invention. Finally, FIG. 12 shows a plurality of data sections produced and output by the present embodiment of the disclosure invention, which constitutes a patent specification draft.

Next, the contents of each page of the "Disclosure of Invention Technology" will be described, thereby helping the later description of each step in FIGS. 3 and 4. With reference to FIG. 8 again, when the user enters the above-mentioned graphic interface, the user has to input the name and action (sometime with function) of each frames in the corresponding selected block. In the present embodiment, the picture of FIG. 8 represented by the graphic interface that allows the user to input data can be divided into four major blocks: (1) electronic circuit, apparatus block; (2) means, structure, device; (3) method, steps; and (4) software method having determination steps. On the other hand, the graphic interface could be implemented by icon interface. That is, the "Disclosure of Invention Technology" page 1 provides the user to select the major block through icons which could be shown on the screen of computer and the pattern as shown in FIG. 8. In the icons embodiment, every graphic shown in FIG. 8 would be changed into icon interface for user to use friendly.

Then, the four major blocks shown in FIG. 8 will be described as follow. For example, if the user selects the type of electronic circuit (as shown in the upper left portion of FIG. 8), in addition to input the names of blocks 【A】、【B】、【C】、【D】, the individual action of the blocks A, B, C, D should be also described and input. For example, if a patentable technology relating to communication circuit is disclosed (illustrative only and not involving the principles or theory of electronics and communication) and the constituent elements thereof are as follows. A is a "filter" (the contents in the quotation marks " " is the text input by the user), and the user has to input the description relating to the action or purpose of block A such as "for filtering an input signal". B is an "amplifier", and the user has to input the description relating to the action or purpose of block B such as "for amplifying an input signal". C is an "adder", and the user has to input the description relating to the action or purpose of block C such as "for performing the addition of the output signals of the filter A and the amplifier B". D is a "tuner", and the user has to input the description relating to the action or purpose of block D such as "for adjusting the frequency of the output signal of the adder C, thereby outputting a signal having a frequency conforming to the requirements".

It should be noted that the above content is an embodiment only. If the user intends to disclose different technical contents, such as internal circuit involved in IC design, characteristic block views of circuit, electronic circuit, power electronics, control circuit, circuit for semiconductor procedure, electronic product or even the electronic system, communication website system, computer linkage system or the like that can form or transform into connection among blocks. With the above method, the basic constituent elements of the creative technology can be input. More specifically, the graphic (block) interface can be used as an input interface with respect to different type of patent so as to produce a different kind patent specification, which is unprecedented.

Similarly, with respect to other technical fields of invention, in addition to the name, the user has to input the action, description or content corresponding to each block. For example, if the disclosure patent application case belongs to a structural device, such as a cup. Then, 【α】 is a cup body for receiving liquid or articles; 【β】 is a cup cover for sealing the cup body; 【γ】 is a mouth for serving as an outlet of the contents within the cup body; 【δ】 is a handle for allowing the cup body to be gripped easily without scalding a hand; and 【θ】 is cup legs for supporting the cup body. In this way, the user inputs the names and the actions thereof of the basic constituent elements or may be the processing flowing step by step of the patentable technology. Then, according to the method of the illustrated embodiment, a portion of the patent specification can be formed. When selecting a method (manufacturing method with P, Q, R), steps (steps of an operating procedure) or software method having determination step (processing flow chart with X, Y, Z, W) shown down in FIG. 8, similarly, the basic constituent steps of the core technology of a method invention to be protected can be filled in the 【description】 of the fields 【P】, 【Q】, 【R】 or the 【content】 of the fields 【X】, 【Y】, 【Z】, 【W】 one by one.

The graphic interface shown in FIG. 8 not only allows the user to input names and actions thereof, but also teaches the user to build up basic concepts of filing a patent application, such as which technical contents are necessary to be disclosed or provided, to what degree should the data or contents be disclosed. It should be understood that a patent application not only needs to specify the special functions or effects of the invention, but also needs to further explain how the constituent element or members achieve the required object or function, what is essential technical contents of the implemented technology. The inventor of the disclosure invention is eager to spread this important concept because it will improve the communication between the inventor and the patent staffs like the patent attorney, thereby reducing the difference in mutual understanding.

After the input of the above graphic interface is finished, the procedure proceeds to a step 220 of the method shown in FIG. 2. In the step 220, an output data section is formed according to the input characteristics. The output data section described herein can be claims of a patent specification. In practical use, the claim generated by the step 220 can be a single independent claim or a complete set of texts comprising an independent claim and associated dependent claims. Further, as mentioned in the above, most of the texts mentioned in the "data section" mean the output data of a document, which belongs to an output end. With respect to the contents and description relating to how to constitute an independent claim, it will be explained in further detail with reference to FIG. 3. After finishing the output data section (e.g. independent claim), the user further inputs a data having multiple sets of text areas (step 230), which will be described later with reference to FIG. 9.

FIG. 9 shows the contents displayed in the second page (PAGE 2 of the "Disclosure of Invention Technology") of the user input interface according to the embodiment of the present invention. In this page, the user needs to describe the motive and object of his/her invention 10. For example, the user can describe the contents and drawbacks of the prior art or current art available in the market (i.e. background of invention), the objects and improvements of the disclosure invention or the like. As shown in FIG. 9, these text areas include five major text areas and the heading title and related description of each bank are as follows: [Motive of Invention] motive text area 12 for describing the motive of the disclosure invention; [Object of Invention] object text area 14 for describing the object of the disclosure invention; [Field of Invention] text area 15 for describing the field of the disclosure invention; [Description of background art] text area 16 for describing the background art; and [Drawbacks of background art] text area 18 for describing the drawbacks of background art. In this way, the user is allowed to input the technical contents of his/her disclosure invention. The inputting can be achieved by keying in directly with a keyboard, transforming a voice input into a word file, or scanning a word file. Further, the layout of the text blocks 12-18 is only illustrative. The inventor or user can modify the name or change the number of the blocks according to the practical demands.

On the other hand, FIG. 10 shows the related description of the disclosure invention, which is also used as one of the multiple text areas input by the user. As mentioned in the above, it is the third page (PAGE 3 of the "Disclosure of Invention Technology") of the user input interface. In the present embodiment, there are five text areas, and the heading title and the related description thereof are as follows: [Method for solving the problems] text area 20 for describing the method for solving the problems; [Comparison between the disclosure invention and background art] text area 30 for describing the comparison between the disclosure invention and background art; [Embodiment (the embodied method, steps, circuit, device, structure or chemical component of the disclosure invention)] text area 40 for describing the embodiment; [Technical expansion of the disclosure invention] text area 50 for describing the technical expansion of the disclosure invention; and [Reference document] text area 60 for describing the reference document. The above five major text areas allow the user to input and describe his/her disclosure invention with respect to individual items.

FIG. 11 shows the drawings or other supplementary information of the present invention, in which a drawing section is provided to allow the user to input. As mentioned in the above, it is the fourth page (PAGE 4 of the "Disclosure of Invention Technology") of the user input interface and includes the following items: a drawing section 70, a text area 72 for the brief description of the drawings; a text area 74 for the reference numerals of primary elements; and a text area 76 for the description of supplementary information. These items allow the user to paste the drawings of the present invention. In USA, the text area 74 reference numerals of primary elements is used to be only reference, it'll not be transferred into output data section. With the trans-pasting of the drawings, the brief description of the drawings, and the drawings or a portion of the patent specification can be formed. Further, it may be the supplementary information of some related technical documents, such as pictures of an actual body or comparisons in experimental data. In this way, the user who is going to produce the patent specification can better understand the technology of the disclosure invention.

FIG. 12 shows a frame of a patent specification. In the present embodiment, there is a plurality of data sections including eight major data sections, and the heading title and related description thereof are as follows: [Title of Invention] first data section 1000; [Abstract] second data section 1200; [Field of Invention] third data section 1300; [Background art] fourth data section 1400; [Summary of Invention] fifth data section 1500; [Detailed description of Invention] sixth data section 1600; [Brief description of drawings] seventh data section 1700; and [Claims] ninth data section 1900. The above layout is a standard form for filing a patent application to the Patent Office. Of course, the user can incorporate the drawings sheets into the patent specification and thus makes it more complete.

With reference to FIG. 2 again, after inputting the data of multiple sets of text areas (step 230), the input data of multiple sets of text areas (shown in FIGS. 10 and 11) can be cooperated with the above-mentioned output data section (e.g. one is an independent claim of the Claims) to combine, judge, trans-paste and arrange the input contents of the user, thereby forming multiple sets of output data sections (step 240). With respect to the contents of the multiple sets of output data sections, it will be described later with reference to FIG. 12. As for the process of combining, judge, trans-pasting and arranging the multiple sets of text areas to form multiple sets of output data sections, it will be described later with reference to FIG. 4. After completing the description of the contents of the multiple sets of output data sections, a document (i.e., a patent specification or a patent drafting) is formed. Then, outputting or printing the document (step 250) to complete a copy of the patent specification. Until now, the procedure shown in FIG. 2 is described completely.

The above copy of the patent specification could be only a patent specification draft, to which the user can refer when filing a patent application. However, the above copy of patent specification has been already provided with the basic structure of a standard patent specification, which is much closer to the standard form of a formal patent specification for filing in comparison with the contents of the disclosure of patent application filled by general R&D staffs or inventor. Therefore, via the method of the illustrated embodiment in this invention, a document that is much closer to the standard form of a patent specification can be obtained rapidly, thereby reducing the time for the communication between the R&D staff, inventor and the patent staffs, and also reducing the time for composing the patent specification. In this way, the discussion and communication between two parties with respect to the patent application can be further smooth and efficient. Further, the method of the illustrated embodiment teaches the user some basic concepts necessary for filing a patent application. Therefore, the inventor can be understand which contents should be disclosed for filing a patent, and understand that it is necessary to disclose practical embodiment or best mode for implementing the disclosure invention because only disclosing the effects and objects of the disclosure invention or abstract concepts is not enough to file a patent application. Thus, the present invention really has creativeness.

In order to descript FIG. 3, please reference to FIG. 2 again, in the step 220, the technical characteristics input by the user form an output data section, such as the technical content of an independent claim of a patent specification, which will be described later in FIG. 3. FIG. 3 comprises a FIG. 3A and a FIG. 3B. FIG. 3A shows a step of forming an independent claim preliminarily in the illustrated embodiment of this invention, and FIG. 3B shows the step of extending the content of the independent claim formed preliminarily in FIG. 3A by restricting it with conditions, thereby deleting unnecessary description and suggesting the description of related regulations.

With reference to FIG. 3A, in a step 300, the user inputs a title (or a temporary title), a plurality of names of primary elements, and the action and function of individual element. In this step, the basic constituent elements and the functions thereof input by the graphic interface are disclosed in FIG. 8. The user has to input and describe the primary technical contents. Of course, preferably, the graphic interface is used as a user input interface. Furthermore, for friendly using, the graphic interface could be implemented by icon interface, which provides the user to choose the basic constituent elements by double click. Similarly, the above-mentioned temporary title is used in consideration of the fact that the inventor may spend a lot of time to decide a title. In order to proceed to the next stage of this patent document, a temporary title is used as the title of invention. After the whole document is completed, this temporary title can be modified to an appropriate one. Of course, if the user is well experienced in patent practice, he/she can input a complete title of invention directly.

Then, in a step 310, fixed texts and symbols are cooperated with the input title (or temporary title) to form a data unit. The fixed texts mentioned herein is a string of texts with punctuation marks inserted therein, thereby becoming a portion of the description of the claims. This portion can be one line (or one row) of wording of the claims, such as the description of the preamble of the claims. For example, if the input title is 【T】 with fixed texts and symbols, after being arranged and combined, it can be output as:

a 【T】, comprising:

In the above line, the texts having double underlines are fixed texts, which are merely an aspect of one embodiment and can be changed if other suitable wordings are required form user. Further, with the associated punctuation marks, the preamble and connecting phrase (the connecting phrase is the term "comprising") of a claim can be formed, thereby forming a so-called data unit. The data unit can be one line of text string or one paragraph of the description of the claim. Since the texts of the name may exceed one line to become multiple lines of description, when entering next data unit, the description of the texts will change to another line to continue. For example, if T is a signal processing circuit, the output texts will be:

a 【signal processing circuit】, comprising:

In this way, the preamble and connecting phrase of the claim can be formed. That is to say, a so-called data unit is formed and the preliminary description of claims has been completed.

Then, the procedure proceeds to the step 320, in which one of the plurality of basic elements input previously is cooperated with the fixed texts and symbols to form another data unit corresponding to the data unit. First, for example, the plurality of basic elements mentioned herein is some element blocks 【A】, 【B】, 【C】, 【D】 shown in FIG. 8 and input by the user. As shown in the above, these elements are the primary constituent elements of the technical contents of the disclosure invention. Further, the user has to input the name of each element and the corresponding action thereof. The above-mentioned another data unit can first change to the next line to continue the description when entering the next line or next paragraph, and thus is called "another". More specifically, the step 320 aims to one of the elements, such as the element A that is a filter for filtering an input signal. Such description will be transformed by the method provided by the present invention into:

a 【filter】for 【filtering an input signal】;

Similarly, the texts having double underlines are fixed texts, the wordings within the 【】represent the name and the corresponding function thereof of the input basic constituent element. On the other hand, this line of description has already changed to the next line. Therefore, if combined with the preamble and the connecting phrase, the layout of the texts can be formed as follows.

a 【signal processing circuit】, comprising:
a 【filter】r 【filtering an input signal】;

Therefore, the model of the output data section (i.e. claim 1) mentioned in the step 220 of FIG. 2 is formed, and thus the next basic element can be selected and described. Since the elements B, C, D are not described, the whole description is not completed, and thus the data unit corresponding to other element should be described subsequently. According to the same example, the block B shows an amplifier for amplifying an input signal. This data unit is combined with the previous data units and arranged to form a layout as follows:

a 【signal processing circuit】, comprising:
a 【filter】for 【filtering an input signal】;
an 【amplifier】for 【amplifying an input signal】;

Wherein, the fixed word "a" or "an" in the beginning of line is depend on the block name. Then, the element C (as adder previously) is described subsequently. Since the arrows of the blocks in the graphic interface are determined that the output ends of the blocks A, B are connected to the input end of the block C as an input signal of the block C as shown in FIG. 8. That is, the block C has two input ends, and thus the fixed texts of this data unit should be changed accordingly. After being combined and arranged, the fixed texts and symbols of this data unit for block C becomes the description as follows (indicated by the double underlines).

a 【C】, one input end thereof being electrically connected to said 【A】, the other input end thereof being electrically connected to said 【B】, thereby for 【function C】;

It has to be emphasized that the connection of the blocks in the graphic interfaces shown in FIGS. 2 and 8 can be moved according to the demands of the user. The user just only moves or draws the arrow to the desired block. The direction of the arrow can be adjusted as the input, output direction or dual directions. If the direction of the arrow is changed, the arrangement of the fixed texts in the data unit will be changed accordingly. For example, the output of the block A is not connected to the block C but connected to the block B directly as an input of the block B. The output end of the block B is connected to the block C as an input end of the block C, thereby forming a connection in series. The connection of the blocks A, B, C and the arrangement of the data units will form a layout as follows.

a 【A】, for 【actionA】;
a 【B】, an output end thereof being electrically connected to said 【A】for 【action B】;
a 【C】, an output end thereof being electrically connected to said 【B】f 【action C】;
or
a 【A】, or 【actionA】;
a 【B】, electrically connected to said 【A】f 【action B】;
a 【C】, electrically connected to said 【B】for 【action C】;

Therefore, there are two kinds of descriptions for connection, so that the user can select one for describing in an alternative way. In general, the writing style and terms used by a patent staff may be different from the other one. The embodiment of the present invention is merely provided for reference. For example, the description relating to the circuit connection can be only expressed as " . . . , connected to said 【 . . . 】for . . . ". On the other hand, if the arrow is a dual-directional one, that is, the connection between the elements A and B are dual-directional, the fixed texts of 【A】and 【B】 also can be:

a 【A】, or 【actionA】;
a 【B】, electrically connected to said 【A】f 【action B】;
the description can be another modified as:
a 【A】, for 【actionA】;
a 【B】, electrically connected to said 【A】in a dual-directional transmission for 【action B】;
the user can select one kind of description according to his/her own writing habit.

With reference to FIG. 3A, the procedure proceeds to the step 330 for determining whether all of the basic elements input by the user form a corresponding data unit individually or not. This step determines whether each basic element has a corresponding line of description or not. For example, as mentioned in the above, first beginning with the description "a 【A】...", then changing to the next line, another description "a 【B】..." is provided. Since the user inputs four blocks A, B, C, D, further descriptions should be provided to form the data units of the blocks C, D. When all of the basic elements are completely formed, the plurality of data units is combined together to form a data section (step 340). This step is to integrate each paragraph of the blocks A, B, C, D, that is, the individual data units are integrated into a single data unit, which is data unit having multiple paragraphs or lines of description for facilitating the word processing of the patent specification later. In the present embodiment, this data unit can be an independent claim.

Please refer to the previous example. The block C is an adder connected with the filter A and the amplifier B respectively. The action of the block C is to perform an addition of the output signals of the filter A and the amplifier B. Further, the block D is a tuner connected to the output end of the block C for adjusting the frequency of the output signal of the adder, thereby outputting a signal conforming to the required frequency. Similarly, when describing 【D】, it is necessary to change to the next line to continue the description. In this way, the output result of the present invention is as follows.

A 【T】, comprising:
a 【A】 for 【action A】;
a 【B】 for 【action B】;
a 【C】, an input end thereof being electrically connected to said 【A】, the other input end being electrically connected to said 【B】 for 【action C】;
a 【D】 electrically connected to said 【C】 for 【action D】.

After the user fills in the individual content of A, B, C, D, the result is as follows.

A 【signal processing circuit】, comprising:
a 【filter】 for 【filtering an input signal】;
an 【amplifier】 for 【amplifying an input signal】;
an 【adder】, an input end thereof being electrically connected to said 【filter】, the other input end being electrically connected to said 【amplifier】 for 【performing an addition of output signals of the filter and the amplifier】;
a 【tuner】 electrically connected to said 【adder】 for 【adjusting the frequency of the output signal of the adder, thereby outputting a signal conforming to the required frequency】.

In this way, the description of an independent claim of a patent specification of the present invention can be completed. The user can save it or print it out as a reference written document.

On the other hand, if the user selects the graphic interface of the block 214 indicating a structural device, as mentioned in the previous example, 【α】 is a cup body for receiving liquid or articles; 【β】 is a cup cover for sealing the cup body; 【γ】 is a mouth for serving as an outlet of the contents within the cup body; 【δ】 is a handle for allowing the cup body to be gripped easily without scalding a hand; and 【θ】 is cup legs for supporting the cup body, the independent claim will be output as follows.

A 【cup】, comprising:
a 【cup body】 for 【receiving liquid or articles】;
a 【cup cover】 provided on a top of said 【cup body】 for 【sealing the cup body】;
a 【mouth】 provided on one side of said 【cup body】 for 【serving as an outlet of the contents within the cup body】;
a 【handle】 provided on another side of said 【cup body】 for 【allowing the cup body to be gripped easily without scalding a hand】;
a 【cup legs】 provided on a bottom of said 【cup body】 for 【supporting the cup body】.

In this way, the description of an independent claim of a patent application for a structural device is completed, in which the fixed texts relating to the description of the handle can be modified as follow.

a 【handle】 provided on the other side of said 【cup body】 with respect to the 【mouth】 for 【allowing the cup body to be gripped easily without scalding a hand】;

Therefore, the connection is alternatively described in terms of both sides of the cup body, which is different from the previous description, so that the user can select as an alternative description. Further, the "provided on" can be changed into "fixed on" or "mounted on" by user corresponded with his invention situation.

Similarly, according to the method of FIG. 3A, if the user selects a graphic interface indicating a method procedure or biological chemistry, the present invention can also generate an independent claim of a patent specification. For example, with reference to the user interface shown in FIG. 3A, if the user selects the block indicating a method procedure and fills the names in 【P】, 【Q】, 【R】 and fills the description in the frame 【description】, the layout is output as follows.

A 【T(title)】, comprising the steps of:
performing 【P】;
performing 【Q】;
performing 【R】;
thereby completing the steps of 【T】.

Therefore, even though the user selects a graphic interface indicating a method procedure, an independent claim of the method can be also formed. Similarly, the direction or position of the arrows between the blocks can be changed according to the practical demands. Once the connection between the arrows is changed, the description of the fixed texts of the claim will be changed accordingly. On the other hand, the "performing" can be also changed into a Verb+ing to describing the action. If the user selects the graphic interface indicating a software method having determination steps, the user has to fill in the blocks 【X】, 【Y】, 【Z】, 【W】 and the frame 【content】, and thus the claim is described as follows.

A 【T(title)】, comprising the steps of:
performing 【X】
determining whether 【Y】 is satisfied or not;
if 【Y】 is satisfied performing 【Z】;
if 【Y】 is not satisfied, performing 【W】, and returning to perform 【X】;
thereby completing the steps of 【T】.

Of course, the writing style of the claims of some software methods needs not to describe detail all the steps one by one if the method has a lot of determination actions. Instead, the essential steps can be described as a whole main follow chart likes the 【P】, 【Q】, 【R】, which is a description of an independent claim. Thereafter, if necessary, another action (i.e. another path) performed after the determining action can be further described, which can be arranged in a dependent claim. On the other hand, the "determining whether...or not" is corresponded with the diamond block shown in FIG. 8. That is, the user choice different type of blocks the words in the body of claims would be adjusted to fit. Further, the "if..." is also the same thereof.

More specifically, with the above method, when the user inputs the elements and the corresponding descriptions in the graphic interface shown in FIG. 8, a descriptive text of the claims in a patent specification can be obtained directly after performing the method of the present invention. Further, the displayed written style according to the present invention conforms to the form of a patent application that can be adopted by the user for filing.

On the other hand, the formal expression of claims is stipulated in the regulations of the Patent Law, Code of Federal Regulation, Implementing Regulations of the Patent Law and Manual of Patent Examining Procedure. Especially, it is stipulated in the Manual of Patent Examining Procedure that the written expression of claims may make the scope of the claims indefinite for R & D members or general inventors. The present invention also takes some of the principle into consideration, so that the patent specification generated by the present invention can conform to the regulations of the related Acts more accurately.

With reference to FIG. 3B, it is an extension of FIG. 3A. After the preliminary claim is finished in FIG. 3A, the descriptive texts of said claim are judged word by word to determine whether there are improper words or not. If yes, then the improper words are deleted, and an indicative text frame is displayed to inform and teach the user that those words should not be present in the claims of a patent specification because they will make the scope of the claim indefinite and thus needs to be deleted or modified.

The first step 400 of FIG. 3B is to determine whether a negative description is present in the data section (i.e. the preliminary claim finished in FIG. 3A). The so-called negative description such as "except . . . " or "not . . . " may make the scope of the claim indefinite and thus needs to be deleted. That is to say, the negative description should be deleted (step 402). Unless such wording has a definite meaning in a specific field, it can be used in the claims.

Then, the procedure proceeds to the step 410 for determining whether the data section has a wording for defining values such as minimum, maximum or 0%, 100%. For example, if the description has the wording such as "larger than . . . ", "smaller than . . . ", " . . . or more", " . . . or less", "0~ . . . %", such kind of wording may make the scope of the claim indefinite, further not fit for MPEP. In practice, when there are one or more embodiments in an invention, many well-experienced patent staffs often adopt the expression of "at least one . . . " in an independent claim. Therefore, when determining that this kind of expression is present, it is necessary to further determine whether this expression can be understood by those who refer to the field of the disclosure invention (step 412). If yes, this expression can be kept. If not, the expression should be deleted, and an indicating frame (step 414) is displayed to inform (or teach) the user that such expression is improper and needs to be deleted.

Then, the procedure proceeds to the step 420 for determining whether the wording "about" or "close to" is present in the data section because these expressions also make the scope of the claim indefinite. Thus, if this kind of expression such as "about" or "close to" is present in the claim, it should be deleted, and an indicating frame is displayed to inform the user that such expression is improper in a claim and needs to be deleted (step 422). Similarly, the procedure proceeds to the step 430 for determining whether the data section has an expression of relative standard or indefinite degree, such as "far larger than . . . ", "low temperature", "high temperature", "difficult to . . . ", "easy to . . . ", "thick", "thin", "strong", "weak" or the like because these expressions also make the scope of the claim indefinite. If positive, the expression of "relative standard" and "indefinite degree" description should be deleted, and an indicating frame is displayed to inform the user that such expression should be deleted (step 432). However, if such wording has a definite meaning in the specific field of the disclosure invention or those who has common knowledge in the field of the disclosure invention can understand the scope of the wording based on the contents of the patent specification, these expressions can be used. For example, the film transistor, thin memory model, low-temperature polycrystalline silicon or the like are well known in the field of this art, and thus they will not make the scope of claims indefinite.

Then, the procedure proceeds to the step 434 for determining whether the wording "on demands", "if necessary", "if has", "especially", "in particular", "essential", "more preferably", "preferably", "for example", "etc.", "or the like" is present in the data section. These wordings may define different scopes in one claim to make the scope of claim indefinite. Thus, if these wordings are present, they should be deleted and an indicating frame is displayed to inform the user that such wording should not be present in the data section (step 436).

Finally, the procedure proceeds to the step 440 for determining whether the data section satisfies the principle of "single sentence". For example, this step determines whether the last punctuation mark is a period or a full point at the end of the description of each element of the data section and before changing to the next line. Further, the Manual of Patent Examining Procedure provides that a period or a full point shall be used only at the end of the sentence of an independent or dependent claim. If there are too many technical characteristics and the mutual relationship is very complicated, the claim shall be described in several paragraphs. Therefore, if there are more than two (including two) periods in the data section (independent claim), this is in violation of the above principle of "single sentence". As a result, it is necessary to modify the whole description of the data section, that is, to modify the punctuation mark to form a description in one sentence. At this time, an indicating frame is displayed (step 442) to inform the user that the principle of "single sentence" should be complied with, and thus modification is necessary. In this way, a data section 450 that conforms to the requirements for the description of a patent specification more accurately is completed. Via the determining and processing steps of the method in FIG. 3B, the wordings and expressions that do not conform to the patent examining procedure and may make the scope of the claim indefinite are all eliminated, thereby perfecting the contents thereof. Further, this data section can be an independent claim (also in practical use).

According to the above, the claims (maybe the independent claim) of a patent specification are completed. Next, the other data sections of the patent specification will be finished subsequently. With reference to FIG. 4A, it shows the preliminary descriptions of the "Background of Invention", "Summary of Invention (i.e. Brief Description of Invention)" and "Detailed Description of Invention" of the patent specification of the present invention. Please also refer to FIGS. 9, 10 and 12. As for FIG. 12, it shows the form contained in the patent specification output by the present invention, which is divided into the first to eighth data sections 1000 to 1800 that have already described in the above. Further, FIG. 9 shows that the user inputs the motive or object of the present invention in the "Disclosure of Invention Technology", which is the text area of the second page (block 10) and has already described in the above. FIG. 10 shows that the user inputs the related description of the present invention in the "Disclosure of Invention Technology", which is the text area of the third page and has already described in the above.

In FIG. 4A, first, the motive text area 12 of the present invention input by the user is trans-pasted and arranged to the fifth data section 1500 (the reference numeral 1500 is shown in FIG. 12) of the data that is going to be output (step 500), that is the data section of "Summary of Invention" of the patent specification. The correspondence mentioned herein can be the correspondence between the text blocks in the present invention, and for example, the text block of the input end corresponds to the block of the output data section. As for the trans-pasting, the attributes of the texts between different blocks can be transformed in the present invention, and for example, the text contents of an image file can be transformed into the text contents of a word file. Transforming the attribute of the file can facilitate the layout of the texts. As for the arrangement, it can be a layout operation of arranging the paragraphs or texts and the changing to the next line operations.

Then, the object text area 14 (i.e., the object of the disclosure invention) input by the user is trans-pasted and arranged into the fifth data section correspondingly (step 510), which means the object text area 14 of the disclosure invention input by the user is trans-pasted and arranged into the data section 1500 of the summary of the disclosure invention that has saved the description of the motive of the disclosure invention therein in the previous step. After changing to the next line, the description of the object of the disclosure invention is trans-pasted, so that the contents of the fifth data section 1500 includes the description relating to the motive and object of the disclosure invention. According to the contents of the "Disclosure of Invention Technology" shown in FIG. 9, the text area 16 of prior art ("Background of Invention") input by the user is trans-pasted and arranged (step 520) to the fourth data section that is the data section 1400 of prior art in the disclosure specification. The step is to further describe the contents of the background of the disclosure invention and the related background art input by the user, thereby understanding the relationship and difference between the patent application on file and the background art. Then, the text area 18 of the drawbacks of prior art input by the user is trans-pasted and arranged (step 530) to the end of the fourth data section 1400. That is, after describing the prior art or the background of the disclosure invention briefly, the description relating to the drawbacks of prior art is supplemented. At this time, the action of changing to the next line can be performed first, and then the trans-pasting of the description is performed. The description relating to the drawbacks of prior art is the essential problems that need to be solved by the disclosure present patent application, and this point is inevitably to be described, thereby exhibiting the inventive steps of the disclosure present patent application. Furthermore, the above four steps also complete the individual associated contents of the input text areas in the second page of the "Disclosure of Invention Technology" in FIG. 9, and perform a processing method of trans-pasting and arranging to the data section of the patent specification in FIG. 12.

Next, in FIG. 4A, the text area of the solution input by the user is trans-pasted and arranged (in order) into the fifth data section correspondingly (step 540). In this step, the contents of the text area 20 of the present invention containing solutions to the drawbacks of prior art are trans-pasted and arranged to the data section 1500 of the summary of invention, thereby describing schematically. Thereafter, in a step 550, the text area of comparison 30 input by the user is trans-pasted and arranged to the last second paragraph of the sixth data section. The sixth data section mentioned herein is the data section 1600 of "Detailed Description of Invention" of the patent specification shown in FIG. 12. In practice, this data section relates to a detailed description of the technology disclosed in the disclosure patent specification, and the essential technology adopted by the disclosure present invention should be described in further detail. The description has to be definite and discloses the implementation of the disclosure present invention sufficiently and supports the contents of claims. The last second paragraph of the sixth data section means the last second paragraph of the text area of the detailed description of the invention, and thus is close to the end thereof. To trans-paste and arrange the descriptive texts relating to the comparison between the disclosure present patent application and the prior art can make the patent specification become more perfect and complete.

Next, the ninth data section is trans-pasted and arranged into the fifth data section to form a continuous description (step 560). The ninth data section 1900 mentioned herein is a description of claims, and the contents thereof right now is an output data section (i.e. claim) completed by FIG. 3A and the improper wordings are deleted according to the determining and modifying steps of FIG. 3B. Therefore, the content thereof is a complete independent claim. The independent claim is trans-pasted into the fifth data section 1500. The fifth data section (the data section of the summary of invention) has been provided with the descriptive wordings of the motive and object of the disclosure present invention and the method for solving the problems. Then, the contents of the claims are trans-pasted thereto to form a description of an embodiment. At this time, since the layout of the claim is formed by means of arranging the individual basic elements in individual lines or paragraphs, the original layout of the texts should be adapted to a description of continuous arrangement. The continuous arrangement means to cancel the original action of changing to the next line, and that is to incorporate the descriptions of individual basic elements together with fixed texts separated therein. With respect to the signal processing circuit in the previous example (of course, it is an illustrative example only without restricting the equivalent change or modification possibly generated by the technical ideas of the present invention), the layout of the independent claim thereof is as follows.

A signal processing circuit, comprising:
a filter for filtering an input signal;
an amplifier for amplifying an input signal;
an adder, one input end thereof being electrically connected to the filter and the other input end thereof being electrically connected to the amplifier for performing the addition of the output signals of the filter and the amplifier;
a tuner electrically connected to the adder for adjusting the frequency of the output signal of the adder, thereby outputting a signal conforming to the required frequency.

Via the continuous arrangement of the method of the present invention, the action of changing to the next line is cancelled and all the paragraphs are integrated together. With the fixed texts between the descriptions of each basic element, the continuous arrangement is re-arranged as follows (the example is as signal processing circuit described before).

This invention is a signal processing circuit, comprising a filter for filtering an input signal; and am amplifier for amplifying an input signal; further provided with an adder, one input end thereof being electrically connected to the filter and the other input end thereof being electrically connected to the amplifier for performing the addition of the output signals of the filter and the amplifier; and provided with a tuner electrically connected to the adder for adjusting the frequency of the output signal of the adder, thereby outputting a signal conforming to the required frequency. With the above arrangement. 【text area of the object of the disclosure present invention】can be achieved.

The layout of the above texts is obviously different from the previous layout of line-by-line or element by element description, which is a continuous arrangement in one paragraph. The fixed texts are the ones having double underlines. As mentioned in the above, the fixed texts can be adjusted according to the demands of the user for an adaptable process. Further, in the last sentence, the object text area 14 of the invention in the second page of the "Disclosure of Invention Technology" input by the user is trans-pasted thereto, thereby perfecting the contents of the data section 1500 of the summary of the invention.

With reference to the step 570 in FIG. 4A, the text area of the embodiment input by the user and the accumulative fifth data section are combined, trans-pasted and arranged to the sixth data section. That is, the contents of the text area 40 of the embodiment in the third page of the "Disclosure of Invention Technology", and the contents accumulated by trans-pasting and arranging the contents of the summary of the invention (the fifth data section) 1500 of the patent specification via the steps 500, 510, 540 and 560 are combined, trans-pasted and arranged to the sixth data section 1600, which is the data section of the detailed description of the patent specification. Then, in a step 580, the descriptive texts in the sixth data section that is trans-pasted from the fifth data section is described in a continuous description manner. The continuous description mentioned in this step can cooperate with at least one string of fixed texts, such as a connecting word for facilitating the arranging continuous sentences. With respect to an embodiment of a practical patent specification, since the sixth data section (as "Detailed Description of the Invention") is a detailed description of the technical contents claimed by the disclosure patent application, the description should be very exhaustive and complete to support the scope of the claims. Therefore, the motive, object of the present invention, the method for solving the problems, and the method adapted in the claims accumulated in the fifth data section (as "summary of invention") 1500 are combined and trans-pasted to the sixth data section (detailed description of the patent specification).

Take the continuous description in the step 560 as an example, the paragraph of the continuous description is trans-pasted to the sixth data section 1600. It should be noted that this example is an embodiment only, and the user can modify the descriptive texts according to the practical demands. The detailed description thereof is as follows.

A 【T】is a 【third data section】and includes a 【A】for 【action A】, 【extracted from the description of connecting relationship of the element A in the fifth data section (if have)】, and in practice, can be achieved by using 【extracted from the text area 40 of the embodiment A】. Further, there is a 【B】【extracted from the description of connecting relationship of the element B in the fifth data section (if have)】for 【action B】, and can be achieved by 【extracted from the text area 40 of embodiment B】. The present invention is further provided with a 【C】【extracted from the description of connecting relationship of the element C in the fifth data section (if have)】for 【action C】, and in practice, can be achieved by 【extracted from the text area 40 of embodiment C】. Also, this invention is provided with a 【D】【extracted from the description of connecting relationship of the element D in the fifth data section (if have)】for 【action D】, and in practice, can be achieved by 【extracted from the text area 40 of embodiment D】. In this way, the 【extracted from the text area 14 of the object of the invention】of the 【T】of the present invention can be achieved.

According to the above description, the contents of the continuous description mentioned in the step 580 of FIG. 4A and the task to be completed can be understood clearly. In addition, via the method of FIG. 4A, the contents of the claims can be also described in the detailed description of the disclosure specification, which means the claims can be supported by the specification, thereby conforming to the related patent regulations.

With respect to the trans-pasting and arranging of the contents of other portions of the patent specification, please refer to FIG. 4B. FIG. 4B shows the contents of the data section of abstract, the dependent claims of the claims, the data section of prior art (or background art), and the last paragraph of the data section of the detailed description. First, the text areas of the motive, object of the disclosure invention and the drawbacks of prior art in the "Disclosure of Invention Technology" are combined with the continuous arrangement of texts in the fifth data section, and then trans-pasted to the second data section (step 590). The second data section 1200 is the data section of abstract of the disclosure specification, as shown in FIG. 12. The action mentioned in the step mainly describes the abstract of the disclosure invention. In general, the description of the abstract is a brief outline of the technology disclosed by the disclosure invention, in which the problems to be solved by the disclosure invention, the primary purpose and the measure for solving the problem are described. In practice, the measure for solving the problems can be the contents of the independent claim 1 of the patent specification.

Therefore, in order to complete the contents of the abstract of the disclosure invention, the motive text area 12 [Motive of Invention], the object text area 14 [Object of Invention], and the text area 18 of the drawbacks of prior art (or background art) [Drawbacks of prior art] in the first page of the "Disclosure of Invention Technology" input by the user are combined with the ninth data section (i.e., independent claim) generated by the step 560 of FIG. 4A. Then, those contents are trans-pasted and arranged to the continuous description of the fifth data section, thereby forming a data section of the abstract of the disclosure invention, which is second data section 1200. In trans-pasting the text data practically, the above integration can combine the contents of the motive text area 12, the object text area 14 and the text area 18 of the drawbacks of prior art to form single paragraph of texts. After changing to the next line, the continuous description of the fifth data section is formed to another paragraph of texts. Of course, the user can select not to change to another line and combine the two paragraphs directly into a single paragraph of description. In this way, the data section of the abstract can be formed into single paragraph of description, thereby meet the individual demands.

After combining and arranging the texts via the above steps, the total number of words in the abstract of the disclosure invention may increase substantially. In general, as stipulated in the Manual Patent Examining Procedure, the number of words of the abstract should not exceed 150 words. According to the practical experience, the abstract of the embodiment of the present invention may have 150 words (only an experience value). Of course, the user can increase or decrease the number of words of the abstract according to his/her real demands. Therefore, the next step 600 is to determiner whether the number of words of the second data section exceeds 150 words or not. If yes, a warning frame indicating "It is suggested that the number of the words of the abstract is 150 at most, and shall not exceed this value. Please delete some words to a proper extent." is displayed (step 602); so that the user can be instructed to understand that the number of words in the abstract of a patent specification cannot be too many. If so, it is suggested that some words in the contents of the abstract should be deleted properly.

Further, the present invention also performs a process with respect to dependent claims in the claims of the patent specification. In general, a dependent claim can be categorized into a detailed type and an additional type. The detailed type dependent claim is to define a portion of the technical characteristic of the independent claim on which it depends, while the additional type dependent claim is to increase technical characteristics that are not contained by the independent claim on which it depends. With reference to the step 604 of FIG. 4B, the text area of the technical expansion 50 input by the user is trans-pasted and arranged to the next data section (to form an dependent claim ) in the ninth data section (step 604). This step is to extract the contents of the text area 50 ("Technical Expansion of the Invention") of the technical expansion input by the user, and then trans-paste into the ninth data section 1900 of the patent specification. Since the ninth data section has already been provided with a set of independent claim, which can be a data section (i.e., a sub data section in the ninth data section). Each subsequent claim can be an individual sub data section. Therefore, after the description of the technical expansion is trans-pasted to the ninth data section, it will be arranged orderly to be next to the independent claim to form subsequent claims. In practice, the technical expansion provided by the R&D staff or inventor is often in a form of additional technology, and thus belongs to additional dependent claims. That is to say, an essential body is described first, and other extended aspects of embodiments are added. The wordings of a dependent claim are as follows.

The [ title of the independent claim ] according to claim [ the independent claim ], further comprising [ the texts of the technical expansion of the invention ].

The contents of the text area 50 of the technical expansion may have a plurality of basic elements or aspects to be added into the body of the independent claim. That is to say, the text area may have a plurality of individual extended descriptions of the basic elements. At this time, the added element or different aspect of each basic element forms the description of a dependent claim individually. With respect to the expression of another kind of dependent claim (detailed type dependent claim), the description of the basic elements of the independent claim is an expression of genus concept. Thereafter, the content of the dependent claim is used to further define the embodied aspect of said basic element. Therefore, the detailed type dependent claim is to explain or specify the content of the basic element of the independent claim on which it depends. The wordings of a dependent claim are as follows.

The [ title of the independent claim ] according to claim [ the independent claim ], wherein said [ one basic element of the independent claim ] is [ the texts of said basic element of the technical expansion of the invention ].

Then, the present invention also aims to further describe the data section 1400 of prior art (the fourth data section) of the patent specification. With reference to the description in the step 606 of FIG. 4B, the text file of the technical description is extracted from the reference data 60 input by the user via the linkage of Internet (step 606). This step is to extract the text contents in the text area 60 of reference data (reference data or document) input by the user. This is not merely a simple correspondence to the documents. Instead, according to the reference data input by the user, the user connects to a patent search website to search and extract the text file of the patent application having the corresponding patent number. This patent application of prior art can serve as a conventional art for the patent application on file. Since some of the forms of the patent specifications in the patent search websites all over the world are text files, and some are image files, in the step 606 of FIG. 4B, whether the extracted patent publication documents are text files or image files, only the contents thereof are extracted. After word identification, the file form is transformed into a text file form that can be used by the present invention, which can serve as the form of the description of the patent specification generated by the present invention.

With reference to the next step 608, the technical description in the downloaded text file of the reference data is trans-pasted and arranged into the fourth data section 608. This step is to extract the technical description from the displayed data of the file extracted in the step 606 (has been transformed into a required file form), and then trans-paste and arrange into the data section of prior art (fourth data section 1400), thereby forming an arrangement of descriptive wordings. The above-mentioned technical description of the reference prior art means the description of the inherent technology of the prior art, but not the contents of the background of the prior art. In practical use, the contents of the abstract of the conventional patent specification, or the description of the representative drawing thereof can be extracted to form the description of the characteristics of prior art in the patent specification.

On the other hand, this paragraph of texts can be arranged between the step 520 and step 530 of FIG. 4A, which means the paragraph of the texts extracted in the step 608 is inserted between the two paragraphs generated by the two steps. In the step 520, the description of prior art is made by the user himself, while in the step 530, the description is the last paragraph of the fourth data section. Therefore, in the present invention, both the published technical documents and the technical description of prior art are trans-pasted in the data section 1400 of prior art to locate between the description of prior art and the last paragraph. In this way, the contents described in the data section of prior art can be more perfect.

Then, the procedure proceeds to the step 610 of FIG. 4B, in which a paragraph of fixed texts is pasted to the last paragraph of the sixth data section. This step is to describe the last paragraph in the detailed description of a patent specification in practice. The last paragraph is to state that the detailed description of the embodiment of the present invention is merely a preferred embodiment thereof, but not intends to limit the scope of the present invention. Basically, equivalent changes according to the claims are still embraced within the scope claimed by the present invention. Such a statement is to declare the spirit and stand of equivalence. Although not specified in the Manual of Patent Examining Procedure or other related patent regulations, this paragraph is almost present in each patent specification. The illustrative wordings of this paragraph are as follow.

The above description is merely a preferred embodiment of the present invention but not used to restrict the scope of the present invention. Various equivalent variations and modifications made according to the claims are also embraced within the scope of the invention as defined in the appended claims.

The above texts having double underlines are fixed texts, and are present in the last paragraph of the sixth data section 1600 (detailed description of the patent specification). Alternatively, this paragraph can be expressed as follows.

Although the present invention has been described with reference to the foregoing preferred embodiments and drawings it will be understood that the invention is not limited to the details thereof. Various equivalent variations and modifications can still be occurred to those skilled in this art in view of the teachings of the present invention. Thus, all such variations and equivalent modifications are also embraced within the scope of the invention as defined in the appended claims.

In this way, the description of the last paragraph of the sixth data section in the step 610 of FIG. 4B can be completed.

Via all the steps (until step 610) of FIGS. 3A, 3B, 4A and 4B, the contents of the ninth data section (claims), the fourth data section (prior art), the fifth data section (summary of the invention), the sixth data section (detailed description of the invention), and the second data section (abstract of the invention) of the patent specification can be achieved. Since the above-mentioned data sections are the portion of a patent specification that takes a lot of time to finish, a patent specification is almost completed after finishing the above data sections.

Therefore, in practical use, the present invention can be adjusted in an adaptable manner. That is to say, the user can produce an output document after completing the description of the claims (the ninth data section) only. Alternatively, the user can produce an output document after completing the description of the prior art (the fourth data section), the summary of invention (the fifth data section), and the detailed description of the invention (the sixth data section) only. In this way, the user can adjust in an adaptable manner according to the demands for the composition of a practical patent specification. Until now, it is necessary to complete the remaining first, third, seventh and eighth data sections of the patent specification, which will be described later.

With respect to FIG. 4B, the procedure proceeds to the step 612, in which the title input by the user is trans-pasted to the first data section 612. In this step, the text of the title (or temporary title) input by the user is trans-pasted into the first data section 100 (i.e., the data section 1000 of the title of invention) of the patent specification. Then, in the next step 614, the text of the field of the Invention input by the user is trans-pasted into the third data section 614. That is to say, the text of the field of the invention that is input by the user in the text area 15 of the field of invention (in the second page of the "Disclosure of Invention Technology") of FIG. 9, is trans-pasted to the third data section 1300 [Filed of Invention] of the patent specification of FIG. 12. In practice, "Field of Invention" refers to the technical field of the present invention on file itself or that can be applied directly, which is not a field of genus concept or upper one level, or not an associated filed. For example, with respect to multiplex demodulation circuits in wireless communication, the technical field of an invention patent application can be described as follows: "The present invention relates to a circuit for wireless communication, and in particular to a multiplex demodulation circuit for wireless communication". In this way, the description of the technical field can be completed.

Then, the procedure proceeds to the step 616 of FIG. 4B, the brief description of drawings input by the user is trans-pasted to the seventh data section. In this step, the texts of the text area 72 of the brief description of drawings in the fourth page of the "Disclosure of Invention Technology" shown in FIG. 11, are trans-pasted into the seventh data section 1700 [Brief Description of Drawings] of the patent specification. For example, the brief description of the drawings can be expressed as follows: FIG. 1 is a view of prior art; FIG. 2 is a schematic view showing the action of the circuit of the first embodiment of the present invention; FIG. 3 is a view showing the embodiment of the present invention, . . . , or the like. Basically, in most patent specifications, FIG. 1 is usually a drawing of related prior art, and subsequent drawings shows the individual embodiments of the present invention. However, such sequence of drawings is not necessary.

In the next step 618, the descriptive wordings of the reference numeral of primary elements input by the user are trans-pasted in the eighth data section. In this step, when filing a patent application, the basic elements in the drawings will be numbered. For example, in a case of communication circuit, the reference numeral 10 refers to A (filter), 20 refers to B (amplifier), 30 refers to C (adder), 40 refers to D (tuner) or the like. When the user is numbering, the reference numerals are not continuous numbers but are the numbers separated at intervals. This is because all the reference numerals will not change unfavorably if the drawings are modified or any element is added. Further, the numbering can be performed in a systematic manner. Specifically, if the elements are extended from the A (filter) 10, they can be numbered in order as 12, 14, 16 or the like (illustrative only). If extended further, they can be numbered as 120, 122, . . . , 140, 142, or the like. On the other hand, it should be noted that the step 618 is not performed when filing a patent application in America or China because the patent specification filed in America or China is not provided with the reference numerals of primary elements of the eighth data section. That is to say, when filing a patent application in America or China, the eighth data section 1800 (Reference Numerals of Primary Elements) of the form of the patent specification in FIG. 12 should be deleted.

Via the descriptions of FIGS. 4A and 4B, the way of constituting the first to the ninth data sections of the patent specification of the present invention, and the way of finishing the ninth data section (independent claim) shown in FIGS. 3A and 3B have been completely disclosed. The user fills the required contents in the "Disclosure of Invention Technology" (first to fourth pages), and the input contents can be transformed into a patent specification draft that conforms to the standard form of a patent specification for filing. For the patent engineer, patent agent or patent attorney and those who are well experienced in patent affairs, it is very convenient to have this draft because he/she may only review or supplement this draft to form a complete patent specification or even submits to the Patent Office directly. Obviously, the present invention increases the efficiency in completing a patent specification to a substantial extent, that is to say, conforms to the requirement for completing the patent specification as soon as possible.

In practice, when composing a patent specification, the inventor is the one who understands the technical contents of the present invention most clearly. However, most inventors are not familiar with the standard form of a patent specification (especially the form of claims) and the related patent regulations. In addition, most inventors would rather spent money to instruct a well-experienced patent staff to finish a patent specification. However, the patent engineer, patent agent or patent attorney and those who are well experienced in patent affairs may not understand this technology so clearly. Even though a Doctor of Electronic Engineering, he/she cannot understand all patent applications relating to electronic engineering very thoroughly. Therefore, the inventor may dispute the quality of the patent specification. Now, via the method of the present invention, the inventor can quickly grasp the form of a patent specification and the basic regulations relating to the composition of the patent specification (especially the form of the claims), and the inventor can complete the description of an independent claim directly. When finishing this draft, the inventor only needs to review the detailed description of the technical contents of the specification to improve the quality thereof. Especially, the description of the characteristics of the technical contents will be more correct. The quality of this patent specification must be superior to that composed by a senior patent staff. Of course, after the sensor or well-experienced patent staff reviewing the contents of the claims of the patent specification, the quality of the whole patent specification would be more perfect.

On the other hand, the software embodying the method of the present invention can be incorporated into a system. The system is a computer system, and in particular a portable computer system. In general, when an inventor completes his/her invention and instructs the patent staff to compose a patent specification for filing a patent application, preferably, both parties can discuss the patent case in a meeting. At this time, via a portable computer system incorporating the method of the present invention, the user can input the associated text data by means of keying in a keyboard, scanning the texts or inputting via voice and then performing word identification. Therefore, a patent specification draft can be generated during the patent meeting. Then, this draft is further reviewed to form a patent specification, thereby increasing the efficiency of a patent meeting substantially and reducing the time period for completing the patent specification.

With reference to FIG. 5, the system incorporating the method of the present invention includes a central arithmetic processing unit 700 for performing a method of producing a patent specification. In general, the system can be a computer system. In comparison with a general computer system, this computer system can perform the method of the present invention for producing a patent specification and output the generated patent specification. Further, the system is provided with a data storage unit 720 connected with the central arithmetic processing unit 700. The data storage unit 700 stores the method of producing a patent specification in a form of a computer software or application program, and provides it to the central arithmetic processing unit 700 to produce a patent specification. Further, the system is provided with an input unit 710 connected with the central arithmetic processing unit 700 for providing a user with input interfaces relating to the disclosure of technology. For example, the user can input data via the form of the "Disclosure of Invention Technology" (the first to fourth pages). Further, the system is provided with a control unit 730 connected with the central processing unit 700. The control unit 730 can control the computer system having the method of producing a patent specification to perform associated controlling processes of producing the related data of the patent specification. Further, the system is provided with an output unit 740 connected with the central arithmetic processing unit 700. The output unit 740 serves as an interface for outputting the related data of the patent specification. For example, the complete patent specification can be output by means of printing it in a written form. Further, the system is provided with a displaying unit 750 connected with the central arithmetic processing unit 700. The displaying unit 750 serves as an interface for displaying the output data of the patent specification, and can be a displayer of a computer for displaying information.

According to the above, the present invention provides a convenient system for the user, and thus the computer system is preferably a portable computer system. With reference to FIG. 6, it shows a practical embodiment of the computer system having the method of producing a patent specification according to the present invention. As for a portable computer system, it can be a Notebook 800 shown in FIG. 6. Of course, a smart mobile phone 802, or a panel computer 804 may be used because they are portable so that the user can carry them to the patent meeting for use.

With respect to the ways of inputting, as mentioned in the above, keying in via a keyboard, scanning the words and identifying as a word file, or inputting via voice and then transforming the voice into a word file may be used. Thus, the Notebook 800 shown in FIG. 6 can include a microphone 810 or a built-in microphone for enhancing the effect of voice input. At this time, the computer system should be provided with software for voice identification, thereby transforming the input voice data into a word file. In this way, the trans-pasting and arranging of the texts performed in the method of producing a patent specification can be facilitated. Further, with respect to the input by scanning words, the Notebook 800 can be further connected to a scanner 812 or a portable scanner 814, thereby scanning the written document data of the user in the computer directly and then identifying as a word file. The connection between the portable scanner 814 and the computer system is provided to facilitate the user to carry them to the patent meeting, thereby improving the efficiency of inputting data.

Finally, the portable computer system can be connected with a printer 820. Since the volume of the printer 820 is larger, in practice, it is a printer that can be used in the meeting location or the office. If so, the printer can be connected to a multiple-purpose office machine 822. If an advanced multiple-purpose office machine 822 is used, it has a built-in function of scanning words, so that the scanner can be omitted. Since the volume of the printing device connected with the computer system is too large, the present invention provides a portable computer system having a printing function and a method for producing a patent specification, as shown in FIG. 7. FIG. 7 shows a panel computer 900 having a method for producing the contents of a patent specification and connected with a printing unit 904. Due to the portability thereof, the printing unit 904 can be output as a written document by means of thermo-sensitive carbon papers. Alternatively, the printing unit can be connected from the exterior of the computer system. The panel computer 900 can be connected to an external keyboard 902, thereby performing the operation of word processing.

Figure 13:
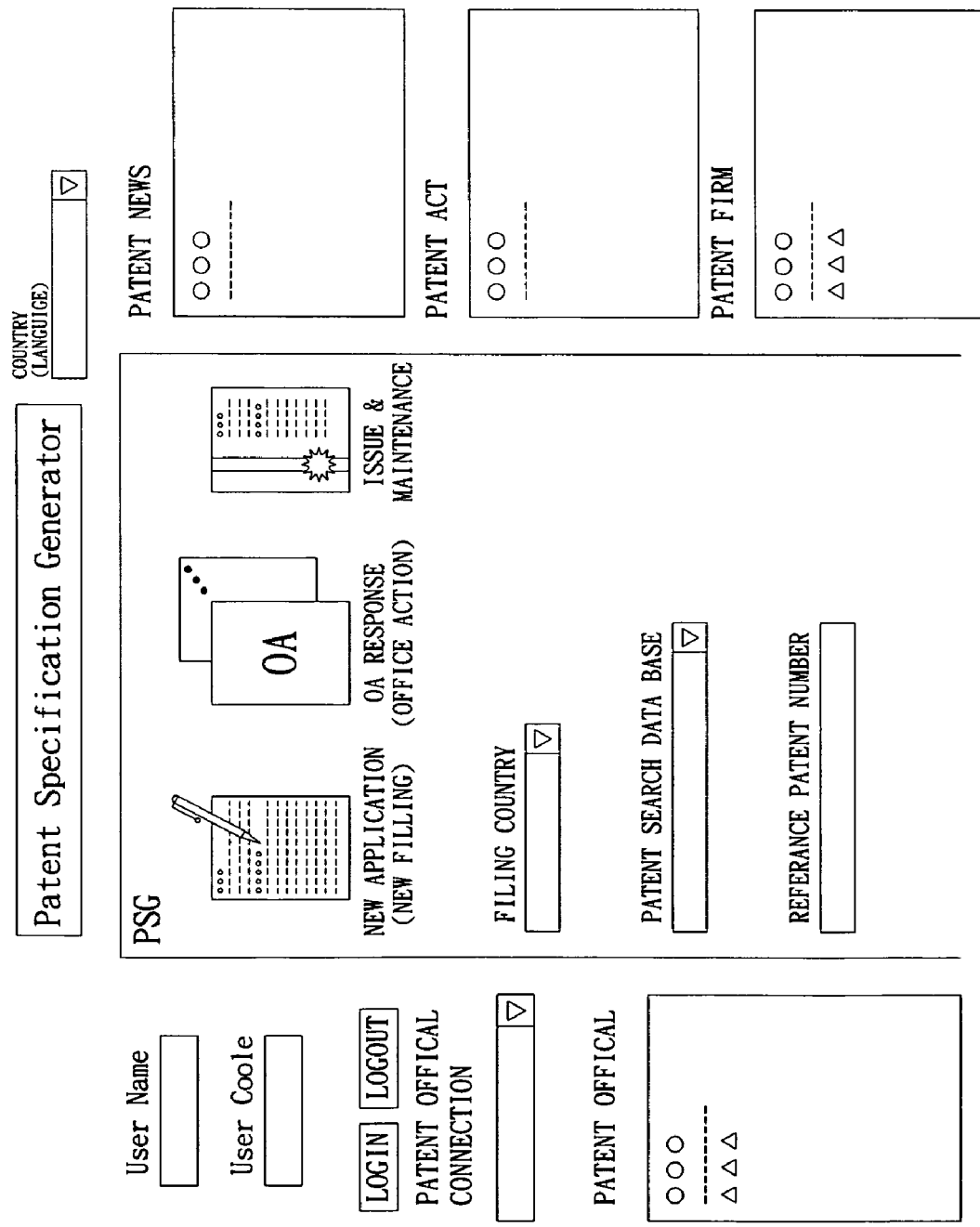

Referring to FIG. 13, it shows the internet website embodiment of this invention. First of all, user can select the language or country as his requirement, and then the language of website screen will be changed. Further, user inputs the name and code to login, and then the icons "NEW APPLICATION", "OA RESPONSE" and "ISSSUE & MAINTANECE" will be presented. For now, user can select the "NEW APPLICATION" icon to do a patent specification of the new patent filling case. The "OA RESPONSE" icon is used for user to do patent official action which objected from examiner. User would prepare amendment and remark document to response the objection. The "ISSSUE & MAINTANECE" icon is used for user to pay the issue fee and patent annual maintenance fee, that is, user could pay the patent matter fee thought the internet website directly of this invention.

Further, FIG. 13 also provides other service of internet website patent information and connection, likes as "PATENT NEWS", "PATNET ACT" AND "PATENT FIRM". The "PATENT NEWS" shows new information that all about patent matter. The new information could present different country's patent news as the use's country selection. In the same way as "PATNET ACT" and "PATENT FIRM", the "PATNET ACT" shows the patent law and patent rule corresponded with different country, the "PATENT FIRM" further shows the patent law firm's advertisement or connection website provided for user to seek and choice.

On the other hand, FIG. 13 also shows "PATENT OFFICAL CONNECTION" for user to connect with different country's official patent office website. Under the "PATENT OFFICAL CONNECTION" is the "PATENT LEARNER" frame which provided for user to take patent E-learning. User can study the content of "PATENT LEARNER" frame to learn the basic patent concept and to know the patent practice. In the main area of FIG. 13, under the "NEW APPLICATION" are the "FILING COUNTRY", "PATENT SEARCH DATABASE" and "REFERENCE PATENT NUMBER". The "FILING COUNTRY" is for user to select the country where he want to file this patent, then FIG. 13 will allow user to do E-filling with the patent specification completed before. The "PATENT SEARCH DATABASE" is useful for user to write the background description of patent specification, that is user can further search similar reference patent to study and transform some relative description into his patent specification. Similarly, the "REFERENCE PATENT NUMBER" is also for the background description and studying. After user select one patent search database, likes USPTO, the "REFERENCE PATENT NUMBER" frame will allow user to input the patent number. This invention will download the searched patent specification and change the file attribute from image into text file for clipping and pasting. As mention in FIG. 9, 10, the Description of prior art 16, Drawbacks of prior art 18 and Reference document 60 are corresponded with the searched patent, so that the "PATENT SEARCH DATABASE" and "REFERENCE PATENT NUMBER" are very helpful for patent specification writing.

Figure 14:
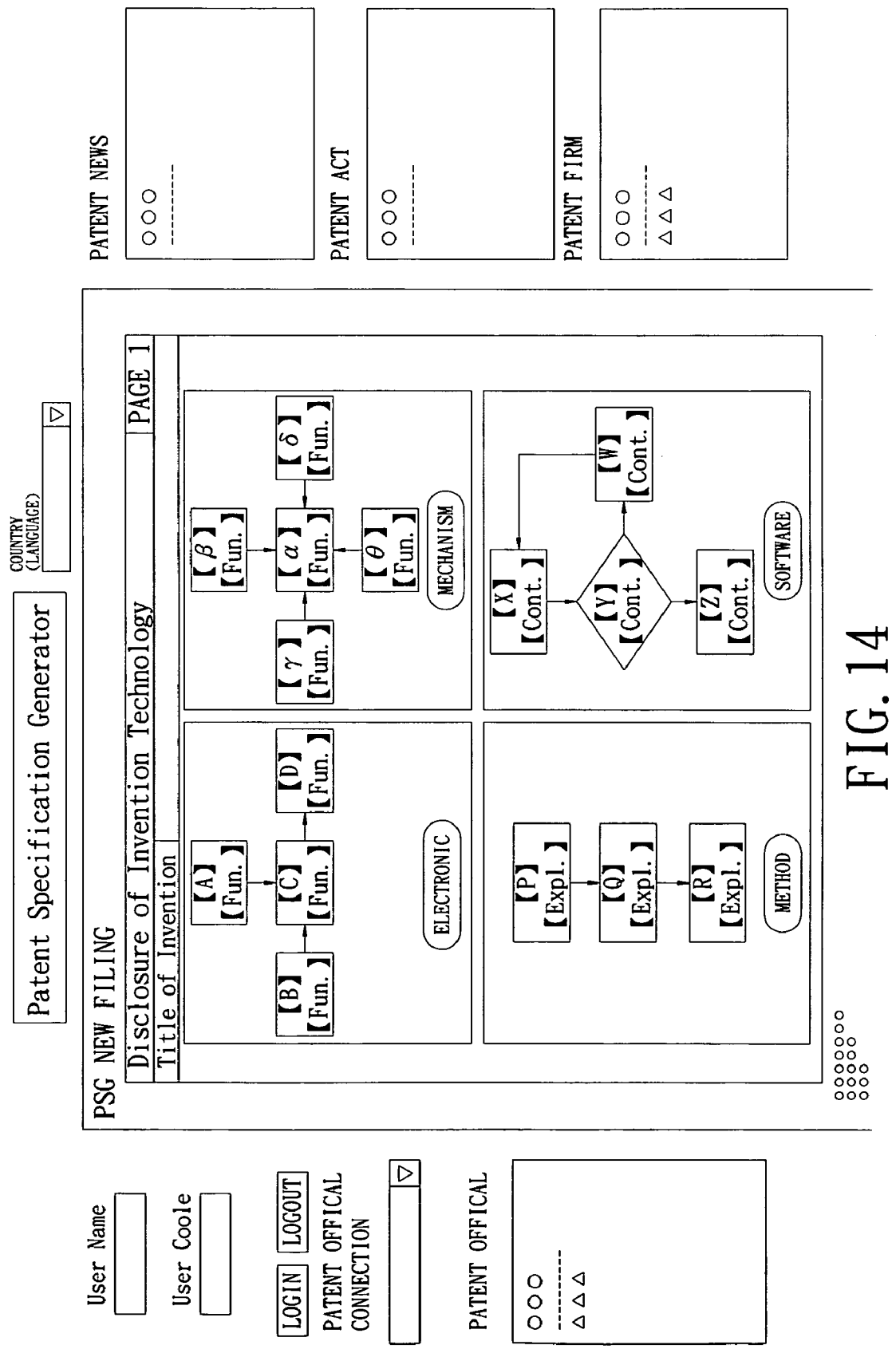

After user selects the "NEW APPLICATION" icon, the Disclosure of Invention Technology will be presented as shown in FIG. 14. The main area "PSG NEW FILING" in FIG. 14 is same as FIG. 8, that is, the user need to select the technical type of his invention, and then input main element name and function, the main claim description would be completed by this invention. After FIG. 14, the following process would be the same as FIG. 9-12 that would not be described repeatedly here.

According to the above, the method for producing a patent specification proposed by the present invention is provided with different graphic interfaces to correspond to various fields of patent applications. The user inputs associated description of the technical characteristics in a "Disclosure of Invention Technology" that is particularly designed for the disclosure of the technology, thereby producing a patent specification draft that not only conforms to the required form of a patent application, but also is ready for filing. In this way, the time to complete the composition of a patent specification can be reduced, and the communication between the inventor and the patent staff such as a patent engineer, patent agent or patent attorney can be facilitated.

The above description is merely a preferred embodiment of the present invention, but not used to restrict the scope of the present invention. Various equivalent variations and modifications made according to the claims are also embraced within the scope of the invention as defined in the appended claims.

What is claimed is:

1. A method for producing a patent specification, comprising the steps of:
    inputting a title;
    entering a set of selection items for selecting the different files of invention from one type of electronic circuit, structural device, software method or biological chemistry;
    providing a computer-enabled graphic interface according to the selected type, inputting names and functions thereof using the graphic interface, wherein the graphic interface uses blocks to show connecting relationship among the inputted contents, and each block represents the user-input name and function or description thereof, so as to produce an output data section, the output data description changes responsive to the change of the connecting relationship of the blocks;
    allowing to input basic elements or units using the graphic interfaces based on the technical characteristics and forming the output data section, comprising:
        (a) combining predetermined texts and symbols of a basic element within the graphic interface having the name for forming a data unit;
        (b) combining the predetermined texts and symbols of another basic element within the graphic interface having the name for forming another data unit;
        (c) determining whether the descriptions of the names and functions within the graphic interfaces input by the user form the data unit;
        (d) combining the data units when the input names and functions form the data unit;
        (e) forming the output data section to be an independent claim;
    forming the output data section as a set of claims;
    operating determinations over the set of claims, comprising:
        (f) determining whether a negative description is presented in the data section, and deleting the negative description if the determination is positive;
        (g) determining whether a defining description indicating the minimum, maximum or comprising 0%, 100% is presented in the data section, further comprising a step of determining the description indicating the maximum or minimum whether it is understood by those who refer to this technical field, deleting the description if the determination is negative, and displaying an indicating frame for generating a warning to the user;
        (h) determining whether an indefinite description is presented in the data section, and deleting such description if the determination is positive;
        (i) determining whether a description contains relative standard or indefinite level is presented in the data section, and deleting such description if the determination is positive;
        (j) determining whether the data section satisfies the principle of "single sentence", and if the determination is negative, modifying the whole description of the data section to correct a description in compliance with requirement of single sentence;
        (k) completing the output data section;
    inputting data into multiple sets of text areas, comprising:
        (l) inputting motivation, objectives, and solutions;
        (m) combining, transferring and arranging the data section of multiple sets of output data sections as the contents of invention;
        (n) inputting prior art and drawbacks, wherein the section of prior art has a text area to be filled with reference documents, a patent number to link to a patent search website via Internet and the text file downloaded from the patent search website, and the descriptive texts of the reference are extracted as the contents of the data section of prior art;
        (o) combining, transferring and arranging the data section of multiple sets of output data sections as the section of prior art;
        (p) inputting comparison;

(q) combining, transferring and arranging the data section of multiple sets of output data sections as detailed description of the invention;

(r) arranging the text area of comparison to the last paragraph of the data section in the detailed description of the invention;

collocating the input data into the multiple sets of text areas with the output data section, transferring and arranging the input description, thereby forming multiple sets of output data sections; and outputting a document having the multiple sets of output data sections as a patent specification.

2. The method for producing a patent specification according to claim 1, wherein:

an indicating frame is displayed for generating a message to the user when the negative description is deleted;

an indicating frame is displayed for generating a message to the user when the description having the indefinite wording is deleted;

an indicating frame is displayed for generating a message to the user when the description containing relative standard or indefinite level is deleted; and an indicating frame is displayed for generating a message to the user when the whole description of the data section is modified to comply with requirement of single sentence.

3. The method for producing a patent specification according to claim 1, wherein forming the claims description and patent specification is applied in an internet website which allows the user to select an item of new filling or an new application icon, the set of selection items for selecting the different filed of invention are showed up.

4. The method for producing a patent specification according to claim 1, further comprising:

a step of combining, transferring and arranging the output data section as an independent claim to the data section of the summary of invention, and performing a continuous description; wherein the input data having multiple sets of text areas is a text area of detailed description of invention;

a step of transferring and arranging the text area of embodiment and the previously accumulated data section of the summary of invention to the data section of embodiments;

wherein after combining the accumulated data section of the summary of invention, the text area of embodiments cooperates with at least one string of predetermined text or connecting word to perform the description and arrangement of continuous sentences, thereby forming a form of descriptive sentences of general technology in the data section of embodiments;

wherein in the step of inputting the data having multiple sets of text areas, motivation, objectives, drawbacks of prior art, combines, transfers and arranges the previously accumulated data of the data section of the summary of invention, thereby forming a data section of the multiple sets of output data sections as a data section of abstract.

5. The method for producing a patent specification according to claim 4, wherein the step of inputting data having multiple sets of text areas is the step of:

inputting a text area of technical expansion, combining, transferring and arranging it to form a data section of multiple sets of output data sections that is a data section of claims or even a data section of an independent claim;

transferring and arranging a description of fixed text to the last paragraph of the data section of embodiments;

inputting a title of invention, trans-pasting and arranging it to form a data section of the multiple sets of output data sections that is a data section of title of invention;

inputting a text area of the field of invention, trans-pasting and arranging it to form a data section of the multiple sets of output data sections that is a data section of the field of invention;

inputting a drawing section of invention, numbering and trans-pasting it to form the drawings of a patent specification;

inputting a text area of brief description of drawings, trans-pasting and arranging it to form a data section of the multiple sets of output data sections that is a data section of brief description of drawings.

6. The method for producing a patent specification according to claim 4, further comprising a step of determining the number of words in the data section of abstract exceeds a predetermined value, displaying a text frame if the determination is positive, thereby informing the user that the number of words in the abstract is too many and needs to delete some.

7. The method for producing a patent specification according to claim 1, wherein the inputting is achieved by inputting via voice and then performing voice identification, or scanning a word file directly and then performing word identification.

8. A method for producing claims of a patent specification, comprising the steps of:

according to technical characteristics, inputting a title and a plurality of basic elements and individual action or function, the input of the plurality of basic elements being achieved by computer-enabled graphic user interfaces, the graphic interface uses blocks to show connecting relationship among the blocks, the user filling in each block with names and functions or description thereof, the output descriptive texts changing upon the change of the connecting relationship between the blocks;

selecting a description of said basic element, cooperating a predetermined text and symbol, combining and arranging the input names to form a data unit;

selecting another basic element of the plurality of basic elements, cooperating a predetermined text and symbol, and arranging it to form another data unit corresponding to the data unit;

determining whether all of the basic elements input have completed configured to form a data unit;

combining the plurality of data unit to form a data section as a description of an independent claim; and operating determinations as completing the data section, comprising:

(a) determining whether a negative description is presented in the data section, and deleting the negative description if the determination is positive;

(b) determining whether a defining description indicating the minimum, maximum or comprising 0%, 100% is presented in the data section, further comprising a step of determining the description indicating the maximum or minimum whether it is understood by those who refer to this technical field, deleting the description if the determination is negative, and displaying an indicating frame for informing and warning the user;

(c) determining whether an indefinite description is presented in the data section, and deleting such description if the determination is positive;

(d) determining whether a description containing relative standard or indefinite level is presented in the data section, and deleting such description if the determination is positive;

(e) determining whether the data section satisfies the principle of "single sentence", and if the determination is negative, modifying the whole description of the data section as a description in single sentence; and (f) completing the output data section.

9. The method for producing claims of a patent specification according to claim 8, wherein:

an indicating frame is displayed for informing or warning the user when the negative description is deleted;

an indicating frame is displayed for informing or warning the user when the description having the indefinite wording;

an indicating frame is displayed for informing or warning the user when the description containing relative standard or indefinite level is deleted; and an indicating frame is displayed for informing or warning the user when the whole description of the data section is modified to form a description in single sentence.

10. The method for producing claims of a patent specification according to claim 8, wherein forming the claims description and patent specification further be is applied in an internet website, when the user selects an item of new filling or an new application icon, the set of selection items for selecting the different filed of invention are showed up.

11. The method for producing claims of a patent specification according to claim 8, further comprising a step of inputting a text area of technical expansion by the user, transferring and arranging it to form one of the data section of claims as at least one dependent claim.

12. The method for producing claims of a patent specification according to claim 8, wherein the inputting is achieved by inputting via voice and then performing voice identification, or scanning a word file directly and then performing word identification.

13. A system for producing a patent specification according to method recited in claim 1 or claim 8, comprising;

a central arithmetic processing unit for performing the method of producing a patent specification;

a data storage unit connected with the central arithmetic processing unit, the data storage unit storing therein the method of producing the patent specification so as to provide the central arithmetic processing unit for the production of the patent specification;

an input unit connected with the central arithmetic processing unit and providing an user with interfaces for inputting the disclosure of related technologies;

a control unit connected with the central arithmetic processing unit and controlling the system to process the data relating to the production of the patent specification;

an output unit connected with the central arithmetic processing unit and serving as an interface for outputting the related data of the patent specification; and a displaying unit connected with the central arithmetic processing unit and serving as an interface for displaying the output data of the patent specification.

14. The system according to claim 13, further comprising a printing unit electrically connected with the central arithmetic processing unit for printing the patent specification.

15. The system according to claim 13, wherein the system is integrated into a notebook, a smart mobile phone, a PDA, or a flat-panel computer to produce the patent specification.

16. The system according to claim 13, wherein the input unit performs voice input and voice identification.

17. The system according to claim 13, wherein the input unit performs scanning a word file and character identification.

* * * * *